(12) United States Patent
Stewart

(10) Patent No.: US 11,467,643 B2
(45) Date of Patent: Oct. 11, 2022

(54) POWER OVER ETHERNET SYSTEM

(71) Applicant: IGOR, INC., Johnston, IA (US)

(72) Inventor: Dwight Lynch Stewart, Johnston, IA (US)

(73) Assignee: IGOR, INC., Johnston, IA (US)

( * ) Notice: Subject to any disclaimer, the term of this patent is extended or adjusted under 35 U.S.C. 154(b) by 1254 days.

(21) Appl. No.: 15/571,417

(22) PCT Filed: May 9, 2016

(86) PCT No.: PCT/US2016/031465
§ 371 (c)(1),
(2) Date: Nov. 2, 2017

(87) PCT Pub. No.: WO2016/183007
PCT Pub. Date: Nov. 17, 2016

(65) Prior Publication Data
US 2018/0129257 A1  May 10, 2018

Related U.S. Application Data

(60) Provisional application No. 62/159,001, filed on May 8, 2015.

(51) Int. Cl.
*G06F 1/26* (2006.01)
*H04L 12/10* (2006.01)
*H01R 4/12* (2006.01)

(52) U.S. Cl.
CPC .............. *G06F 1/266* (2013.01); *H01R 4/12* (2013.01); *H04L 12/10* (2013.01); *H01R 2201/04* (2013.01)

(58) Field of Classification Search
CPC ....... G06F 1/266; H01R 2201/04; H01R 4/12; H04L 12/10
See application file for complete search history.

(56) References Cited

U.S. PATENT DOCUMENTS

| 7,940,787 | B2 * | 5/2011 | Karam | H04L 12/10 |
| | | | | 370/419 |
| 8,928,425 | B1 * | 1/2015 | Sedarat | H04B 3/30 |
| | | | | 333/12 |
| 2005/0243861 | A1 * | 11/2005 | Elkayam | H04L 12/10 |
| | | | | 370/466 |
| 2005/0268120 | A1 * | 12/2005 | Schindler | G06F 16/9537 |
| | | | | 713/300 |
| 2006/0112288 | A1 * | 5/2006 | Schindler | G06F 1/266 |
| | | | | 713/300 |
| 2006/0210057 | A1 * | 9/2006 | Stanford | H04L 12/10 |
| | | | | 379/413 |
| 2008/0168283 | A1 * | 7/2008 | Penning | G06F 1/263 |
| | | | | 713/310 |

(Continued)

*Primary Examiner* — Jaweed A Abbaszadeh
*Assistant Examiner* — Brian J Corcoran
(74) *Attorney, Agent, or Firm* — David M. Breiner; BrownWinick Law Firm

(57) ABSTRACT

Disclosed are systems that may include nodes configured to receive power and data from a cable, for example, an Ethernet cable. In example embodiments, the nodes include a plurality of contacts for delivering data and power to a downstream node. In example embodiments a single pair of contacts may be used to deliver data to the downstream node and three pairs of contacts may be used to deliver power to the downstream node.

11 Claims, 16 Drawing Sheets

(56) References Cited

U.S. PATENT DOCUMENTS

| | | | |
|---|---|---|---|
| 2009/0024856 A1* | 1/2009 | Lee | G06F 1/266 |
| | | | 713/320 |
| 2010/0007334 A1* | 1/2010 | Apfel | H04L 12/10 |
| | | | 324/123 R |
| 2014/0133532 A1* | 5/2014 | Wu | H04L 1/24 |
| | | | 375/221 |
| 2014/0319916 A1* | 10/2014 | Cummings | H01L 31/02021 |
| | | | 307/53 |

* cited by examiner

POWER OVER ETHERNET SYSTEM

CROSS REFERENCE TO RELATED APPLICATIONS

This application is a 371 of International Application No. PCT/US16/31465 which was filed on May 9, 2016, which claims the benefit of U.S. Patent and Trademark Office Provisional Application No. 62/159,001 which was filed on May 8, 2015, the entirety of which is incorporated herein by reference.

BACKGROUND

1. Field

Example embodiments relate to systems that may include nodes configured to receive power and data from a cable, for example, an Ethernet cable. In example embodiments, the nodes include a plurality of contacts for delivering data and power to a downstream node. In example embodiments a single pair of contacts may be used to deliver data to the downstream node and two to three pairs of contacts may be used to deliver power to the downstream node.

2. Description of the Related Art

FIG. 1A is a partial view of a conventional Ethernet cable 10. As shown in FIG. 1A, the Ethernet cable 10 includes four pairs of wires 12, 14, 16, and 18 surrounded by a jacket 20. In the conventional art, the pairs of wires 12, 14, 16, and 18 are generally used to transmit electrical power and/or data to powered devices such as telephones and cameras.

In the conventional art the pairs of wires 12, 14, 16, and 18 are generally color coded. For example, the first pair of wires 12 generally includes a blue wire and a white wire having a blue stripe (white/blue), the second pair of wires 14 generally includes an orange wire and a white wire having an orange stripe (white/orange), the third pair of wires 16 generally includes a green wire and a white wire having a green stripe (white/green), and the fourth pair of wires 18 generally includes a brown wire and a white wire with a brown stripe (white/brown). As shown in FIG. 1A, the pairs of wires are twisted. For example, the blue wire and the white wire having the blue stripe are twisted together as shown in FIG. 1A. Similarly, the orange wire and the white wire having the orange stripe are likewise twisted together as shown in FIG. 1A. Of course, FIG. 1A makes it obvious that the green wire and the white wire with the green stripe are also twisted around one another and the brown wire and the white wire with the brown stripe are also twisted around one another.

FIG. 1B is a view of an Ethernet cable 10. As shown in FIG. 1B, ends of the Ethernet cable 10 generally include modular plugs. For example, a first end of the Ethernet cable 10 may be fitted with a first modular plug 30, for example, an 8P8C plug, and a second end of the Ethernet cable 10 may be fitted with a second modular plug 35.

In the conventional art, the modular plugs 30 and 35 generally include eight pins. For example, as shown in FIG. 1C, the first modular plug 30 may include eight pins 1, 2, 3, 4, 5, 6, 7, and 8 which connect to the pairs of wires 12, 14, 16, and 18 and the second plug 35 may also include eight pins 1', 2', 3', 4', 5', 6', 7', and 8' which connect to the pairs of wires 12, 14, 16, and 18. For example, in the conventional art, the white/green wire connects to the first pin 1, the green wire connects to the second pin 2, the white/orange wire connects to the third pin 3, the blue wire connects to the fourth pin 4, the white/blue wire connects to the fifth pin 5, the orange wire connects to the sixth pin 6, the white/brown wire connects to the seventh pin 7, and the brown wire connects to the eighth pin 8. This configuration is commonly known as a TIA/EIA-568A termination. However, other standard configurations are also used. For example, under a TIA/EIS-568B termination, the white/orange wire connects to the first pin 1, the orange wire connects to the second pin 2, the white/green wire connects to the third pin 3, the blue wire connects to the fourth pin 4, the white/blue wire connects to the fifth pin 5, the green wire connects to the sixth pin 6, the white/brown wire connects to the seventh pin 7, and the brown wire connects to the eighth pin 8.

In the conventional art, an Ethernet cable may have a first end having the 568A termination and a second end having another 568A. In this particular example, the white/green wire connects to the first pins 1 and 1', the green wire connects to the second pins 2 and 2', the white/orange wire connects to the third pins 3 and 3', the blue wire connects to the fourth pins 4 and 4', the white/blue wire connects to the fifth pins 5 and 5', the orange wire connects to the sixth pins 6 and 6', the white/brown wire connects to the seventh pins 7 and 7', and the brown wire connects to the eighth pins 8 and 8'. This is known as a straight through cable. On the other hand, the cable may have a 568A termination on one end and a 568B termination on the other end of the cable. This later configuration is known as a cross-over cable. In the cross-over cable the white/green wire connects to the first pin 1 and the third pin 3', the green wire connects to the second pin 2 and the sixth pin 6', the white/orange wire connects to the third pin 3 and first pin 1', the blue wire connects to the fourth pins 4 and 4', the white/blue wire connects to the fifth pins 5 and 5', the orange wire connects to the sixth pin 6 and the second pin 2', the white/brown wire connects to the seventh pins 7 and 7', and the brown wire connects to the eighth pins 8 and 8'.

Generally speaking, many devices which utilize Ethernet cables use two pairs of wires for data communication. For example, personal computers generally use pins 1 and 2 (or 1' and 2') to send information and pins 3 and 6 (or 3' and 6') to receive information. Switches, on the other hand, generally use pins 1 and 2 (or 1' and 2') to receive information and pins 3 and 6 (or 3' and 6') to send information. Thus, straight through cables allow for a computer to properly communicate with the switch. However, if the computer were connected to another computer instead of a switch, the crossover cable may be used to ensure data is properly sent from one computer to another. Because a first pair of wires may receive data and a second pair of wires may send data, the sent and received data may occur simultaneously allowing for full duplex communication.

As indicated above, conventional Ethernet cables generally include two pairs of wires for data transmission. The remaining wires are generally used to transmit power or may not be used at all.

SUMMARY

Example embodiments relate to a system that may include nodes configured to receive power over Ethernet. In particular, the nodes may be configured to deliver data to a downstream node via a pair of contacts and power to the downstream node via two to three pairs of contacts.

In general, example embodiments are drawn to a node comprising a first port having a four pairs of contacts, a second port having four pairs of contacts, and a circuit configured to provide data to one of the pairs of contacts of the second port and power to two to three of the pairs of contacts of the second port. Example embodiments are also drawn to systems that use the node.

BRIEF DESCRIPTION OF THE DRAWINGS

Example embodiments are described in detail below with reference to the attached drawing figures, wherein.

DETAILED DESCRIPTION

Figure 1A:
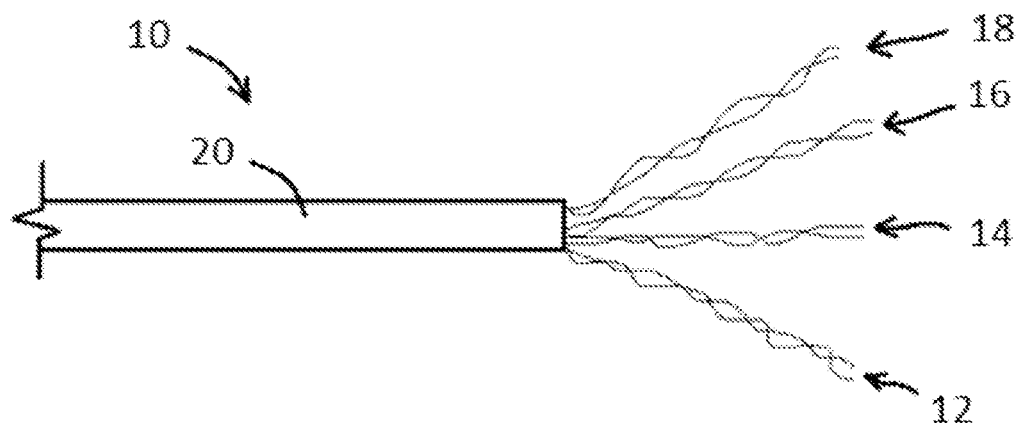
FIG. 1A is a partial view of an Ethernet cable in accordance with the conventional art.
Figure 1B:
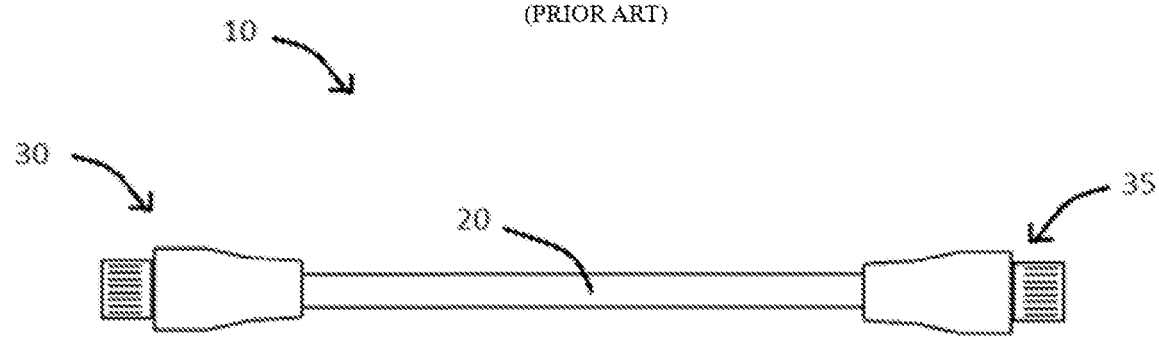
FIG. 1B is a view of an Ethernet cable in accordance with the conventional art.
Figure 1C:
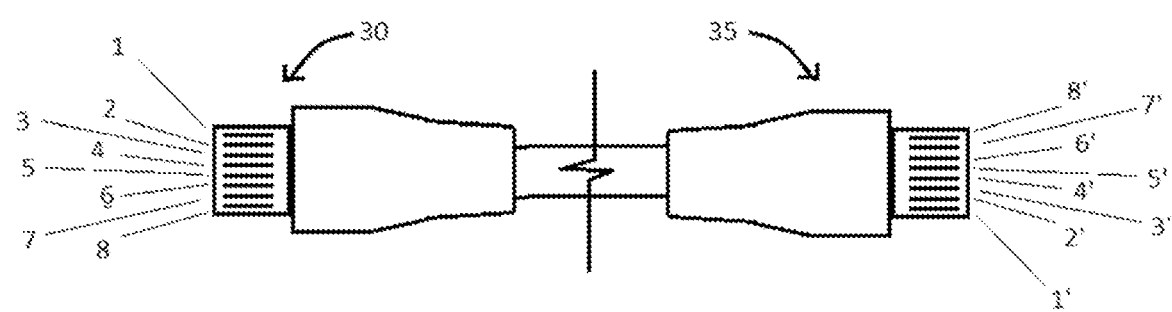
FIG. 1C is a view of the Ethernet cable in accordance with the conventional art.

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to systems that may include nodes configured to receive power and data from a cable, for example, an Ethernet cable. In example embodiments, the nodes include a plurality of contacts for delivering data and power to a downstream node. In example embodiments a single pair of contacts may be used to deliver data to the downstream node and two to three pairs of contacts may be used to deliver power to the downstream node.

Figure 2:
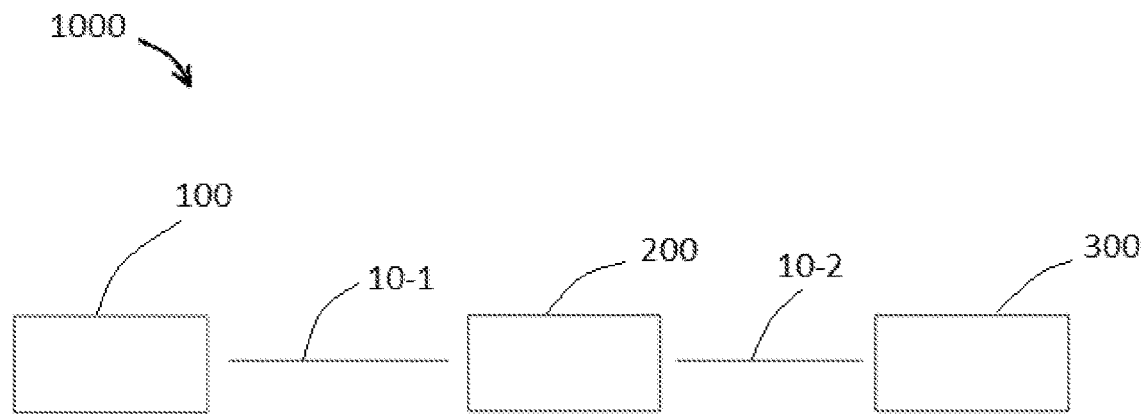
FIG. 2 is a view of a system in accordance with example embodiments.

FIG. 2 is a view of a system 1000 in accordance with example embodiments. As shown in FIG. 2, the system 1000 may include a power and data providing device 100, a node 200, a powered device 300, a first cable 10-1 connecting the power and data providing device 100 to the node 200, and a second cable 10-2 connecting the node 200 to the powered device 300. In example embodiments the first and second cables 10-1 and 10-2 may be, but are not required to be, conventional Ethernet cables.

Figure 3A:
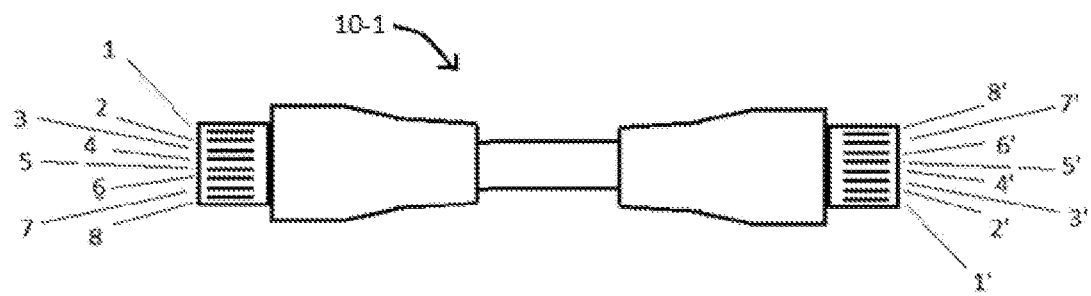
FIGS. 3A and 3B are views of cables usable with example embodiments.

FIG. 3A illustrates an example of the first cable 10-1. As explained above, the first cable 10-1 may be an Ethernet cable. For example, the first cable 10-1 may have a first end having an 8P8C modular connector having eight pins 1, 2, 3, 4, 5, 6, 7, and 8 and a second end having another 8P8C modular connector having another eight pins 1', 2', 3', 4', 5', 6', 7', and 8'. As in the conventional art, the first cable 10-1 may include four pairs of twisted wires connecting the first plurality of pins 1, 2, 3, 4, 5, 6, 7, and 8 to the second plurality of pins 1', 2', 3', 4', 5', 6', 7', and 8'. For example, a first pair of twisted wires may connect the first and second pins 1 and 2 of the first plurality of pins to the first and second pins 1' and 2' to the second plurality of pins. Similarly, another pair of twisted wires may connect the third and fourth pins 3 and 4 of the first plurality of pins to the third and fourth pins 3' and 4' of the second plurality of pins. Similar yet, another pair of twisted wires may connect the fifth and sixth pins 5 and 6 of the first plurality of pins to the fifth and sixth pins 5' and 6' of the second plurality of pins. Similar yet, another pair of twisted wires may connect the seventh and eighth pins 7 and 8 of the first plurality of pins to the seventh and eighth pins 7' and 8' of the second plurality of pins. As such, the first cable 10-1 may resemble a straight through cable. On the other hand, the cable 10-1 may be configured differently, for example, as a cross-over cable. For example, in example embodiments a first pair of wires may connect the first pin 1 of the first plurality of pins to the third pin 3' of the second plurality of pins as well as connect the second pin 2 of the first plurality of pins to the sixth 6' pin of the second plurality of pins. Another pair of wires may connect the third pin 3 of the first plurality of pins to the first pin 1' of the second plurality of pins as well as connect the fourth pin 4 of the first plurality of pins to the fourth pin 4' of the second plurality of pins. Another pair of wires may connect the fifth pin 5 of the first plurality of pins to the fifth 5' pin of the second plurality of pins as well as connect the sixth pin 6 of the first plurality of pins to the second pin 2' of the second plurality of pins. Another pair of wires may connect the seventh pin 7 of the first plurality of pins to the seventh pin 7' of the second plurality of pins as well as connect the eighth pin 8 of the first plurality of pins to the eighth pin 8' of the second plurality of pins.

Figure 3B:
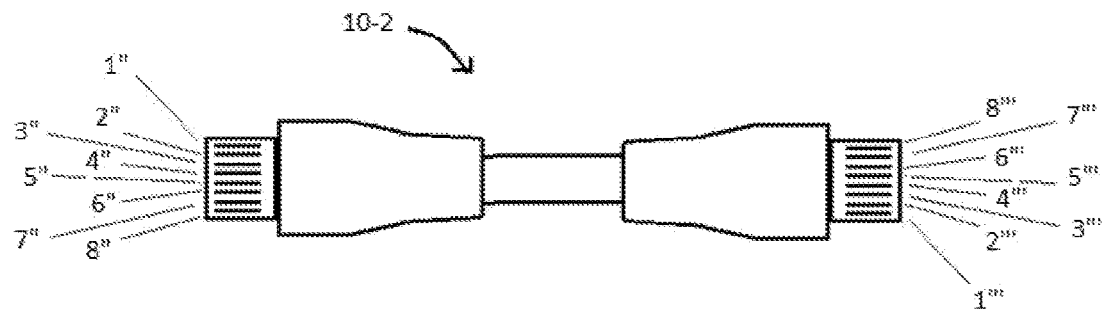

FIG. 3B illustrates an example of the second cable 10-2. In example embodiments the second cable 10-2 may be an Ethernet cable. For example, the second cable 10-2 may have a first end having an 8P8C modular connector having eight pins 1", 2", 3", 4", 5", 6", 7", and 8" and a second end having another 8P8C modular connector having another eight pins 1''', 2''', 3''', 4''', 5''', 6''', 7''', and 8'''. As in the conventional art, the second cable 10-2 may include four pairs of twisted wires connecting the first plurality of pins 1", 2", 3", 4", 5", 6", 7", and 8" to the second plurality of pins 1''', 2''', 3''', 4''', 5''', 6''', 7''', and 8'''. For example, a first pair of twisted wires may connect the first and second pins 1" and 2" of the first plurality of pins to the first and second pins 1''' and 2''' of the second plurality of pins. Similarly, another pair of twisted wires may connect the third and fourth pins 3" and 4" of the first plurality of pins to the third and fourth pins 3''' and 4''' of the second plurality of pins. Similar yet, another pair of twisted wires may connect the fifth and sixth pins 5" and 6" of the first plurality of pins to the fifth and sixth pins 5''' and 6''' of the second plurality of pins. Similar yet, another pair of twisted wires may connect the seventh and eighth pins 7" and 8" of the first plurality of pins to the seventh and eighth pins 7''' and 8''' of the second plurality of pins. As such, the second cable 10-2 may resemble a straight through cable. On the other hand, the second cable 10-2 may be configured differently, for example, as a cross-over cable. For example, in example embodiments a first pair of wires may connect the first pin 1" of the first plurality of pins to the third pin 3''' of the second plurality of pins as well as connect the second pin 2" of the first plurality of pins to the sixth 6''' pin of the second plurality of pins. Another pair of wires may connect the third pin 3" of the first plurality of pins to the first pin 1''' of the second plurality of pins as well as connect the fourth pin 4" of the first plurality of pins to the fourth pin 4''' of the second plurality of pins. Another pair of wires may connect the fifth pin 5" of the first plurality of pins to the fifth 5''' pin of the second plurality of pins as well as connect the sixth pin 6" of the first plurality of pins to the second pin 2''' of the second plurality of pins. Another pair of wires may connect the seventh pin 7" of the first plurality of pins to the seventh pin 7''' of the second plurality of pins as well as connect the eighth pin 8" of the first plurality of pins to the eighth pin 8''' of the second plurality of pins.

In example embodiments the power and data providing device 100 may be configured to transmit data, receive data, and provide power. For example, the power and data providing device 100 may be, but is not required to be, a network switch.

Figure 4:
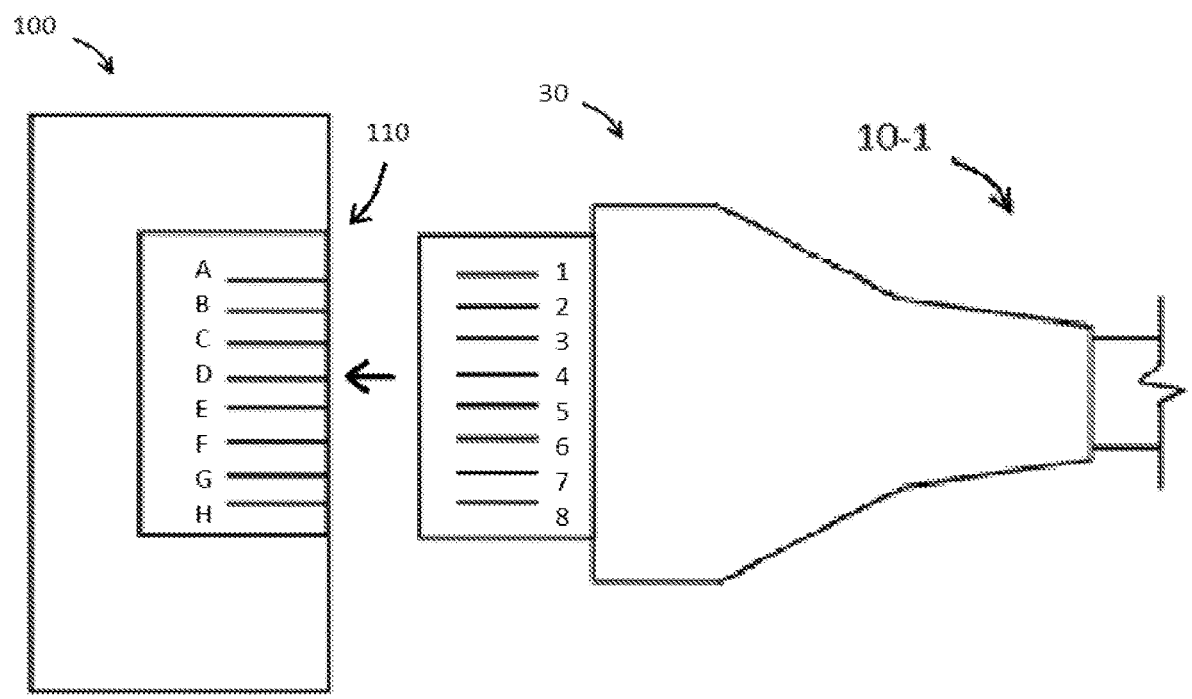
FIG. 4 is a view of a power and data providing device in accordance with example embodiments.

In example embodiments, the power and data providing device 100 may provide both power and data to other devices via the first cable 10-1. For example, in example embodiments the power and data providing device 100 may include a port 110 configured to receive the first end of the first cable 10-1. For example, as shown in FIG. 4, the first cable 10-1 may have an end fitted with an 8P8C modular plug having the plurality of pins 1, 2, 3, 4, 5, 6, 7, and 8 and the first port 110 may be configured to receive the 8P8C modular plug. Further, the first port 110 may include a first electrical contact A configured to electrically connect to the first pin 1 of the cable 10-1, a second electrical contact B configured to electrically connect to the second pin 2 of the cable 10-1, a third electrical contact C configured to electrically connect to the third pin 3 of the cable 10-1, a fourth electrical contact D configured to electrically connect to the fourth pin 4 of the cable 10-1, a fifth electrical contact E configured to electrically connect to the fifth pin 5 of the cable 10-1, a sixth electrical contact F configured to electrically connect to the sixth pin 6 of the cable 10-1, a seventh electrical contact G configured to electrically connect to the seventh pin 7 of the cable 10-1, and an eighth electrical contact H configured to electrically connect to the eighth pin 8 of the cable 10-1. When connected, the power and data providing device 100 may provide data in the form of electronic signals to the third and sixth pins 3 and 6 via the third and sixth contacts C and F and receive data from the first and second pins 1 and 2 of cable 10-1 via the first and second contacts A and B. Power from the power and data providing device 100 may be provided to the fourth, fifth, seventh and eighth pins 4, 5, 7, and 8 of the cable 10-1 via the fourth, fifth, seventh and eighth contacts D, E, G, and H.

The power and data providing device 100 is not intended to be limited by the above description. For example, in some embodiments the power and data providing device 100 may provide power at all eight contacts (A, B, C, D, E, F, G, and H) of the port 110. Cisco, for example, has developed a PoE technology (known as Universal PoE or UPoE) in which power is applied to all contacts. In this technology data is overlaid on applied voltage. Such a system is entirely compatible with example embodiments as will be explained shortly.

Figure 5A:
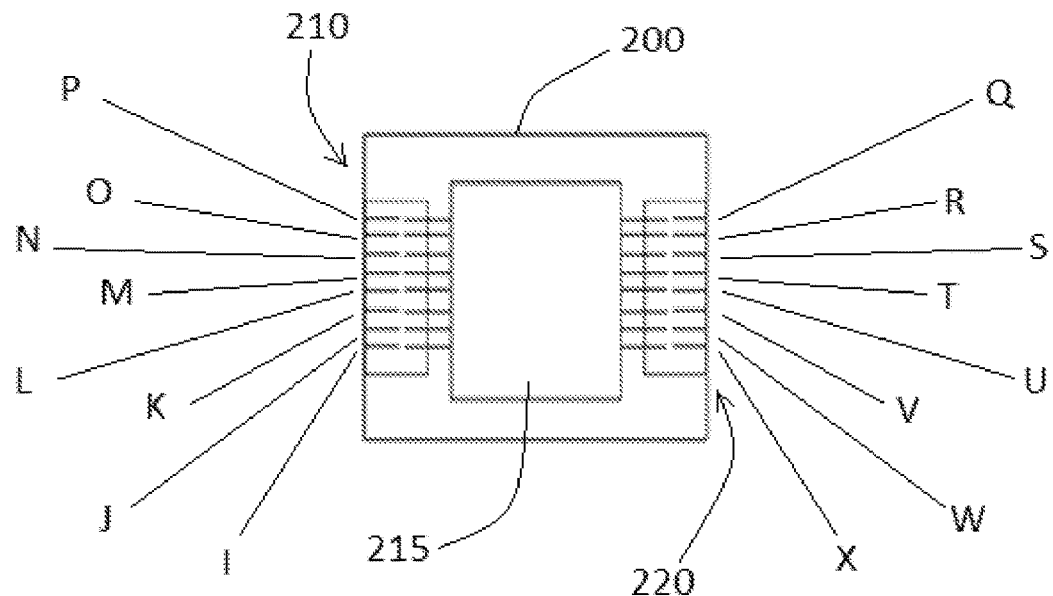
FIG. 5A is a view of a node in accordance with example embodiments.
Figure 5B:
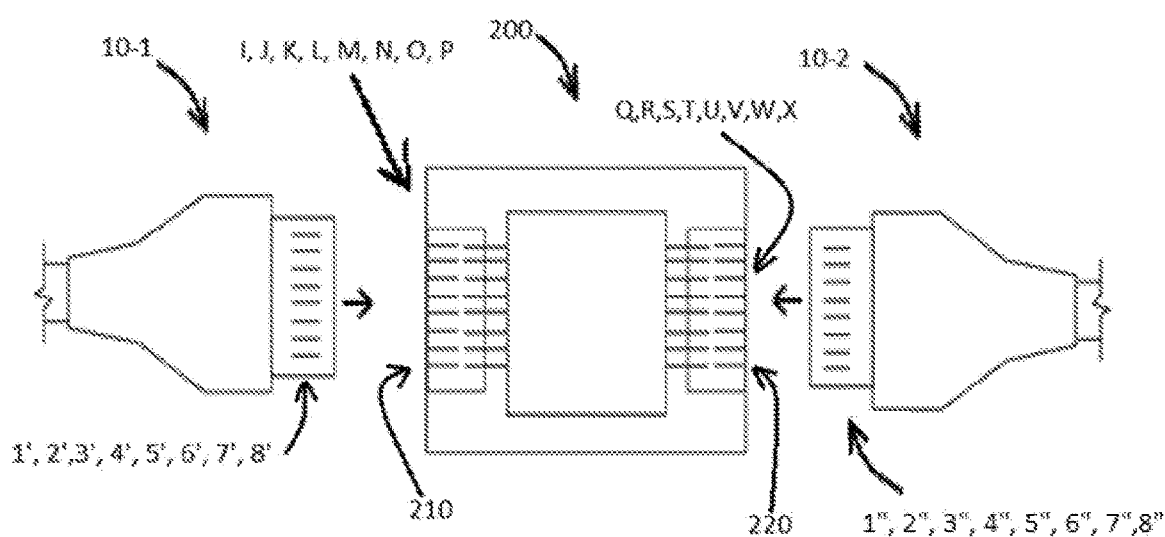
FIG. 5B is a view of cables and the node in accordance with example embodiments.

FIG. 5A is a view of the node 200. As shown in FIG. 5A, the node 200 may include a first port 210 configured to receive a second end of the first cable 10-1 and a second port 220 configured to receive a first end of the second cable 10-2. In example embodiments the node 200 may include a circuit 215 between the first port 210 and the second port 220.

In example embodiments, the node 200 may be configured to receive the data and power from the power and data providing device 100 via the first cable 10-1. The node 200 may also be configured to send data back to the power and data providing device 100 via the cable 10-1. For example, in example embodiments the first port 210 may include a first electrical contact I configured to electrically connect to the first pin 1' of the cable 10-1, a second electrical contact J configured to electrically connect to the second pin 2' of the cable 10-1, a third electrical contact K configured to electrically connect to the third pin 3' of the cable 10-1, a fourth electrical contact L configured to electrically connect to the fourth pin 4' of the cable 10-1, a fifth electrical contact M configured to electrically connect to the fifth pin 5' of the cable 10-1, a sixth electrical contact N configured to electrically connect to the sixth pin 6' of the cable 10-1, a seventh electrical contact O configured to electrically connect to the seventh pin 7' of the cable 10-1, and an eighth electrical contact P configured to electrically connect to the eighth pin 8' of the cable 10-1.

In example embodiments, when the power and data providing device 100 is connected to the node 200 by the cable 10-1, data and power provided from the power and data providing device 100 may be provided to the node 200 via the cable 10-1. For example, when the first cable 10-1 is connected to the power and data providing device 100 and to the node 200 the power and data providing device 100 may provide data in the form of electronic signals to the third and sixth pins 3 and 6 of the first cable 10-1 and these signals may flow through the cable 10-1 to the third and pins 3' and 6' of the first cable 10-1 and to the third and sixth contacts K and N node 200. Conversely, data from the node 200 may be provided to the power and data providing device 100. For example, in example embodiments data from node 200 may be provided to the first and second pins 1' and 2' of the cable 10-1 via the contacts I and J and this data may flow along the first cable 10-1 until it reaches the first and second pins 1 and 2 where it continues to flow to the first and second contacts A and B of the power and data providing device 100.

In example embodiments, power from the data and power providing device 100 may be provided to the fourth, fifth, seventh and eighth pins 4, 5, 7, and 8 of the cable 10-1 via the fourth, fifth, seventh and eighth contacts D, E, G, and H and this power may flow along the first cable 10-1 and to the fourth, fifth, seventh and eighth contacts L, M, O and P of node 200. In another embodiment power from the data and power providing device 100 may be provided to each of the pins 1, 2, 3, 4, 5, 6, 7, and 8 of the cable 10-1 via the first, second third, fourth, fifth, sixth, seventh and eighth contacts A, B, C, D, E, F, G, and H and this power may flow along the first cable 10-1 and to the first, second third, fourth, fifth, sixth, seventh and eighth contacts I, J, K, L, M, N, O, and P of node 200.

As explained above, the node 200 may be configured to receive the data and power from the cable 10-1. In example embodiments the node 200 may be configured to power a device (for example, an LED which may be attached thereto) and/or pass the power and data to the powered device 300 via the second cable 10-2. For example, in example embodiments the node 200 may include a second port 220 configured to receive a first end of the second cable 10-2. For example, as shown in FIG. 3B, the second cable 10-2 may have a first end fitted with an 8P8C modular plug having the plurality of pins 1", 2", 3", 4", 5", 6", 7," and 8" and the second port 220 may be configured to receive the 8P8C modular plug. Further, the second port 220 may include a first electrical contact Q configured to electrically connect to the first pin 1" of the second cable 10-2, a second electrical contact R configured to electrically connect to the second pin 2" of the second cable 10-2, a third electrical contact S configured to electrically connect to the third pin 3" of the second cable 10-2, a fourth electrical contact T configured to electrically connect to the fourth pin 4" of the second cable 10-2, a fifth electrical contact U configured to electrically connect to the fifth pin 5" of the second cable 10-2, a sixth electrical contact V configured to electrically connect to the sixth pin 6" of the second cable 10-2, a seventh electrical contact W configured to electrically connect to the seventh pin 7" of the second cable 10-2, and an eighth electrical contact X configured to electrically connect to the eighth pin 8" of the second cable 10-2.

In example embodiments the node 200 may further include an electronic circuit 215 configured to transfer the data and power received at the first port 210 to the second port 220. In example embodiments the circuit 215 may be designed to provide power to six of the contacts Q, R, S, T, U, V, W, and X and data to two of the contacts Q, R, S, T, U, V, W, and X. For example, in the system 1000 the power and data providing device 100 may be a network switch connected to the node 200 by the first cable 10-1. As such, in this first embodiment, power may be transmitted along the first cable 10-1 and received at contacts L, M, O, and P of the first port 210 and data may be transmitted along the first cable 10-1 and received at the third and sixth contacts K and N. In this particular nonlimiting example, the circuit 220 may process and/or transfer the data to the first and second contacts Q and R of the second port 230 and transfer the power to the contacts S, T, U, V, W, and X of the second port 230. In this particular nonlimiting embodiment, data received at contacts K and N of the first port 210 may be transferred to contacts Q and R of the second port 220 by the circuit 215.

In example embodiments, the circuit 215 may be further configured to transfer data from the second port 220 to the first port 210. For example, in example embodiments, the second port 220 may receive data from the first and second pins 1" and 2" of second cable 10-2 via contacts Q and R of the second port 220. The circuit 215 may process and/or transfer this data to the first and second contacts I and J of the first port 210 and this data may be received at the first and second pins 1' and 2' of the first cable 10-1 transferred along the first cable 10-1 to the data and power providing unit 100.

Figure 6A:
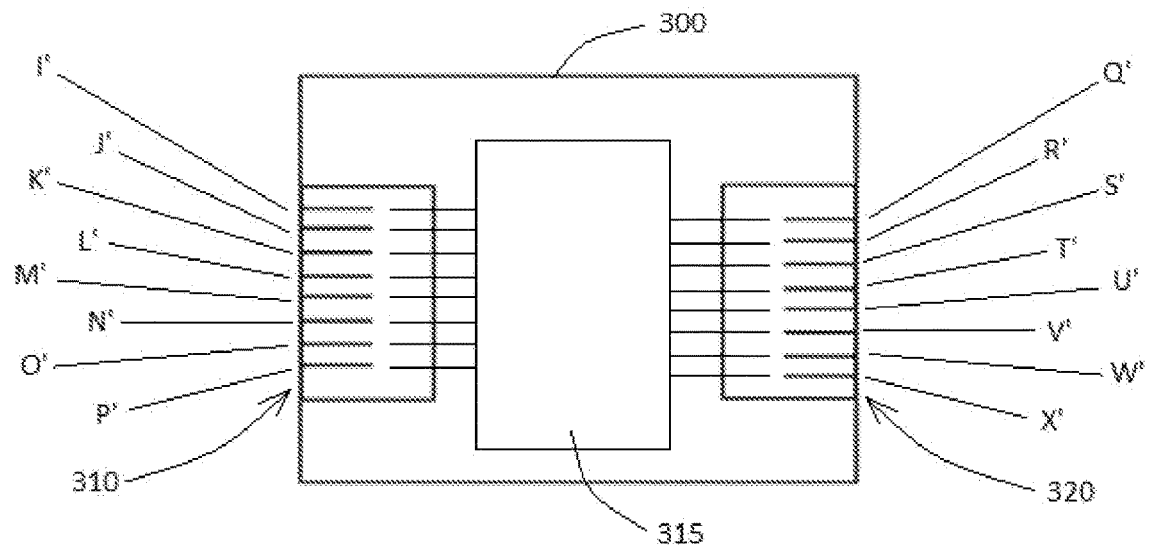
FIG. 6A is a view of a powered device in accordance with example embodiments.
Figure 6B:
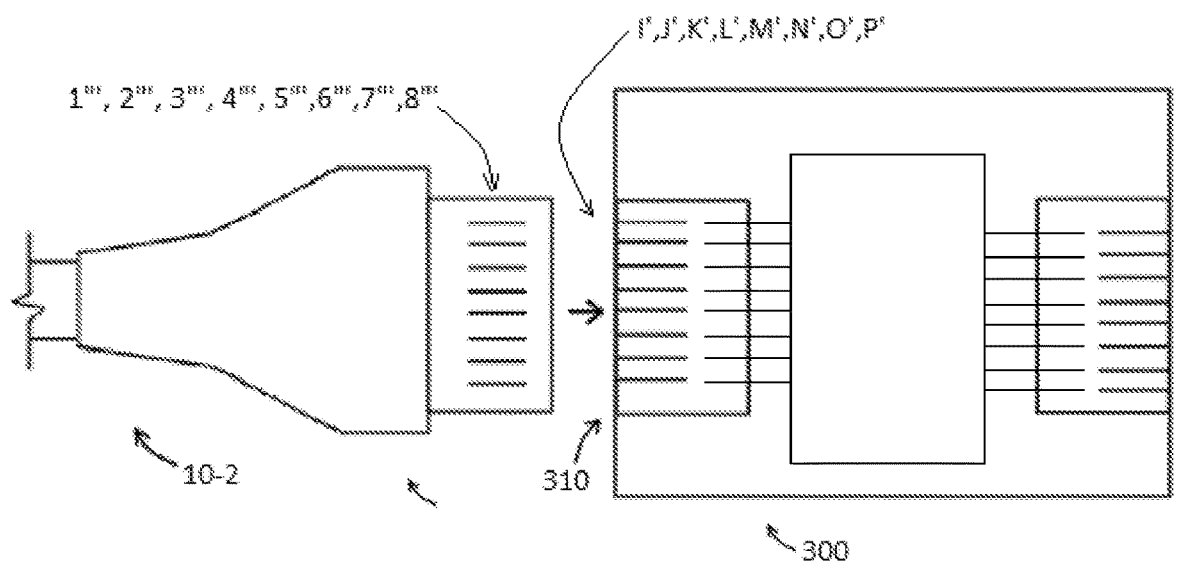
FIG. 6B is a view of a cable and the powered device in accordance with example embodiments.

In example embodiments, the powered device 300 may be configured to receive data and power from the node 200 via the second Ethernet cable 10-2. The powered device 300 may also be configured to send data back to the node 200 via the second cable 10-2. For example, in example embodiments the powered device 300 may include a first port 310 configured to receive a second end of the second cable 10-2. For example, as shown in FIGS. 3B and 6B, the second cable 10-2 may have a second end fitted with an 8P8C modular plug having the plurality of pins 1''', 2''', 3''', 4''', 5''', 6''', 7''', and 8''' and the first port 310 of the powered device may be configured to receive the 8P8C modular plug. Further, the first port 310 may include a first electrical contact I' configured to electrically connect to the first pin 1''' of the second cable 10-2, a second electrical contact J' configured to electrically connect to the second pin 2''' of the second cable 10-2, a third electrical contact K' configured to electrically connect to the third pin 3''' of the second cable 10-2, a fourth electrical contact L' configured to electrically connect to the fourth pin 4''' of the second cable 10-2, a fifth electrical contact M' configured to electrically connect to the fifth pin 5''' of the second cable 10-2, a sixth electrical contact N' configured to electrically connect to the sixth pin 6''' of the second cable 10-2, a seventh electrical contact O' configured to electrically connect to the seventh pin 7''' of the second cable 10-2, and an eighth electrical contact P' configured to electrically connect to the eighth pin 8''' of the second cable 10-2.

In example embodiments, when the node 200 is connected to the powered device 300 by the second cable 10-2, data and power provided from the node 200 may be provided to the powered device 300 via the second cable 10-2. For example, the data provided by the node 200 may be provided in the form of electronic signals to the first and second pins 1'' and 2'' of the second cable 10-2 and these signals may flow through the second cable 10-2 and to the first and second contacts I' and J' of the powered device 300. Conversely, data from the powered device 300 may be provided to the node 200. For example, in example embodiments data from the powered device 300 may be provided to the first and second contacts I' and J' which is in electrical contact with the first and second pins 1''' and 2''' of the second cable 10-2 and this data may flow along the second cable 10-2 until it reaches the first and second pins 1'' and 2'' where it continues to flow to the first and second contacts Q and R of the node 200. This data may flow to the circuit 215 and then onward to the power and data providing device 100 via the first cable 10-1. Power from the node 200 may be provided to the third, fourth, fifth, sixth, seventh, and eighth pins 3'', 4'', 5'', 6'', 7'', and 8'' of the second cable 10-2 via the third, fourth, fifth, sixth, seventh, and eighth contacts S, T, U, V, W, and X and this power may flow along the second cable 10-2 and to the third, fourth, fifth, sixth, seventh, and eighth contacts K', L', M', N', O', and P' of the powered device 300.

In example embodiments the powered device 300 may further include an electronic circuit 315 which may be configured to process and/or transfer the data and power received at the first port 310 to a second port 320. In example embodiments the circuit 315 may be designed to provide power to six of the contacts Q', R', S', T', U', V', W', and X' of the contacts of the second port 320 and data to two of the contacts Q', R', S', T', U', V', W', and X' of the second port 320. For example, in the powered device 300 may receive data via contacts I' and J' and the circuit 315 may send this data to the contacts Q' and R'. As for power, in example embodiments, the powered device 300 may receive power from the third, fourth, fifth, sixth, seventh, and eighth contacts K', L', M', M', N', O', and P' and the circuit 315 may transfer this power to the third, fourth, fifth, sixth, seventh, and eighth contacts R', S', T', U', V', W', and X'.

In example embodiments data communication between the node 200 and the powered device 300 occurs over the same pair of wires. As such, communication between the node 200 and the powered device 300 may be half-duplex communication.

Though not shown in the figures the node 200 and the powered device 300 may be associated with (or attached to) various electrical components. For example, in example embodiments, the circuit 315 may be associated with a light (for example a light emitting diode) and may control the light based on data it receives from the node 200. Similarly, the node 200 may also be attached to a light and the circuit 215 may control the light based on data it receives from the power and data providing device 100. On the other hand, each of the node 200 and the powered device 300 may be associated with a camera or a phone which may be controlled by the circuits 215 and/or 315.

It should be understood that one skilled in the art may consider the powered device 300 a node. As such, this application discloses at least two types of nodes. The first type is configured to engage in both full duplex and half-duplex communication. For example, node 200 is configured to receive power and data from a network switch. In this embodiment the node 200 is configured to receive and transmit data over two pairs of wires and therefore is configured for full duplex communication with the network switch. This node, however, also has a port in which data with a downstream node is transmitted and received over a same pair of wires. As such, node 200 communicates with the downstream node via half duplex communication. As such, the first type of node is configured to engage in both full duplex and half-duplex communication. This type of node is also configured to receive power from two pairs of wires of a first cable and then deliver power to three pairs of wires of a second cable. In example embodiments, the second type of node (for example, powered device 300) is configured for half-duplex communicate both with an upstream node and a downstream node. Furthermore, this node is configured to receive power at three sets of contacts and data at another pair of contacts. This same device is configured to transfer at least some of the power to three additional contacts within the node and data to another pair of contacts so that at least some of the power and data may be transferred to a downstream node.

Figure 7:
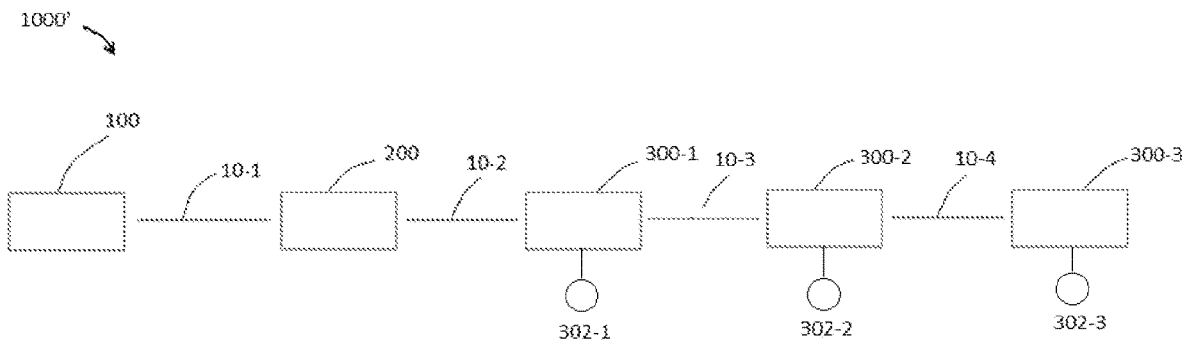
FIG. 7 is a view of a system in accordance with example embodiments.

FIG. 7 is a view of another system 1000' in accordance with example embodiments. As shown in FIG. 7, the system 1000' includes the power and data supply device 100 (which may be a network switch), a first node 200, and a plurality of powered devices 300-1, 300-2, and 300-3. Although this particular example shows the plurality of powered devices as being comprised of three devices, example embodiments are not limited thereto as there may be more than three powered devices in the plurality of devices or less than three powered devices in the plurality of powered devices. As shown in FIG. 7, the node 200 and the plurality of powered devices 300-1, 300-2, and 300-3 may be daisy chained together and connected via various cables which may be, but are not required to be, Ethernet cables. For example, as show in FIG. 7 a first cable 10-1 may connect the power and data providing device 100 to the node 200, a second cable 10-2 may connect the node 200 to the first powered device 300-1, a third cable 10-3 may connect the first powered device 300-1 to the second powered device 300-2, and a fourth cable 10-4 may connect the second powered device 300-2 to the third powered device 300-3.

In example embodiments the powered devices may include elements that perform a specific function. For example, the powered devices 300-1, 300-2, and 300-3 may include lights 302-1, 302-2, and 302-3 which may be, but are not required to be, light emitting diodes. On the other hand, the powered devices 300-1, 300-2, and 300-3 may be some other type of powered device such as, but not limited to, an IP camera or a telephone.

In example embodiments, power and data from the power and data providing device 100 may flow along the first cable 10-1 to the node 200 where the data is received by the node 200. This power and data may flow to the first powered device 300-1 via the second cable 10-2. The first powered device 300-1 may include a light 302-1 (or some other component requiring power) and may control the light 302-1 based on the data. The data and power may also flow to the second powered device 300-2 which may also include a light 302-2 (or some other component requiring power) and the second node 300-2 may control the light 302-2 based on the data. The data and power may continue to flow to the third powered device 300-2 via the fourth cable 10-4 and the third powered device 300-2 may control a light 302-3 (or some other component requiring power) based on the data.

In example embodiments data in the system 1000' may flow in two directions. For example, the third powered device 300-3 may send data to the power and data providing device 100 via the fourth cable 10-4, the second powered device 300-2, the third cable 10-3, the first powered device 300-1, the second cable 10-2, the node 200, and the first cable 10-1. In example embodiment data flowing along the second, third, and fourth cables 10-2, 10-3, and 10-4 may flow along single pairs of wire. As such, communication between the node 200, the first powered device 300-1, the second powered device 300-2, and the third powered device 300-3 may be half-duplex communication. However, in this system, power may flow along three pairs of wires in each of the cables 10-2, 10-3, and 10-4. As such, the system 1000' of example embodiments has an advantage over the prior art in that daisy chained devices have power provided over three pairs of wires in each cable whereas as the convention art generally provides power over a mere two pair of wires. As such, the system of example embodiments allow for various devices to be daisy chained together and operated without the need for additional injectors to power the daisy chained devices.

Figure 8:
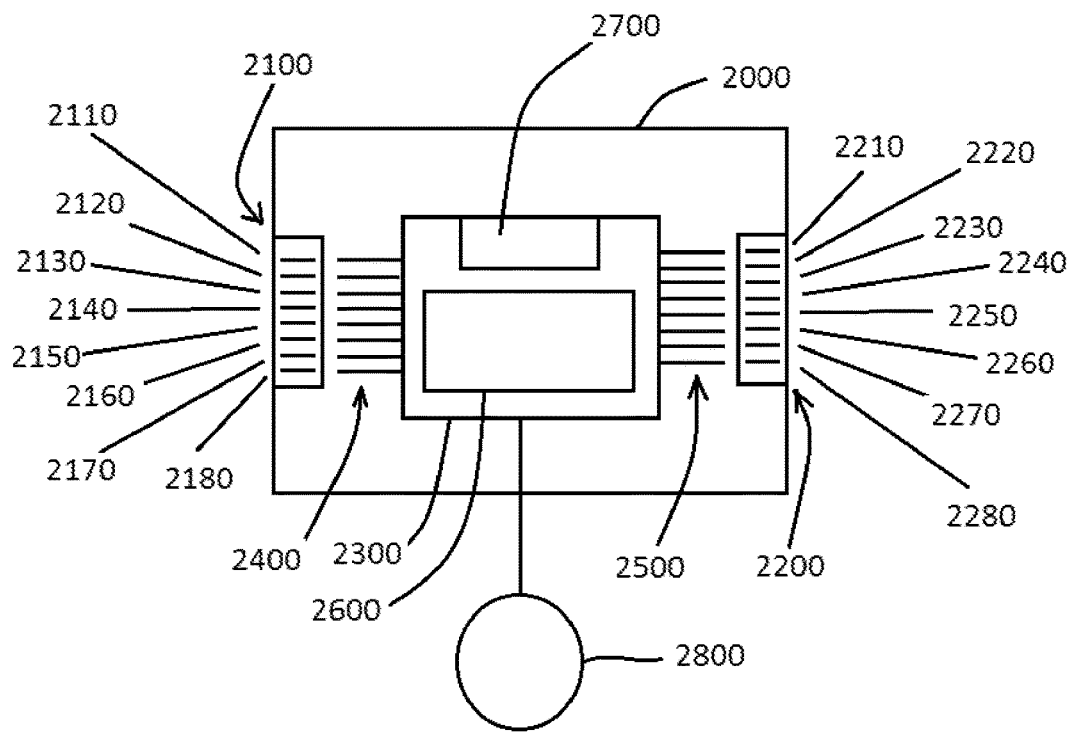
FIG. 8 is a view of a node in accordance with example embodiments.

FIG. 8 is a view of another node 2000 in accordance with example embodiments. As shown in FIG. 8, the node 2000 may include a first port 2100 configured to connect to a cable, a second port 2200 configured to connect to another cable, and a circuit 2300 electrically connected to the first and second ports 2100 and 2200.

In example embodiments the first port 2100 may be, but is not required to be, configured to attach to an Ethernet cable. For example, in example embodiments, the first port 2100 may include a first contact 2110, a second contact 2120, a third contact 2130, a fourth contact 2140, a fifth contact 2150, a sixth contact 2160, a seventh contact 2170, and an eighth contact 2180 configured to engage pins of a conventional Ethernet cable. Likewise, the second port 2200 may also be, but is not required to be, configured to attach to an Ethernet cable. For example, in example embodiments, the second port 2200 may include a first contact 2210, a second contact 2220, a third contact 2230, a fourth contact 2240, a fifth contact 2250, a sixth contact 2260, a seventh contact 2270, and an eighth contact 2280 configured to engage pins of another conventional Ethernet cable.

In example embodiments, the circuit 2300 may be configured to be powered by a low voltage (for example, five volts). For example, in the nonlimiting example of FIG. 8, a low voltage may be applied to a pair of contacts associated with the first port 2100 and this voltage may be applied to the circuit 2300 via a plurality of conductive lines 2400 which electrically connect the first port 2100 to the circuit 2300. For example, in example embodiments, the relatively low voltage may be applied to the third and sixth contacts 2130 and 2160 of the first port 2100 via a cable and this voltage may be applied to the circuit 2300 via the plurality of lines 2400. In example embodiments the plurality of lines 2400 may simply be wires or may be conductive traces associated with a printed circuit board.

In example embodiments the circuit 2300 may be further configured to receive data from the first port 2100 via the plurality of lines 2400. For example, in the nonlimiting example embodiment of FIG. 8, the node 2000 may receive data at a pair of contacts. For example, in example embodiments, data may be provided to the first contact 2110 and the second contact 2120 via a cable, for example, an Ethernet cable, and this data may be transferred to the circuit 2300 via the plurality of lines 2400.

In example embodiments the voltage applied at contacts 2130 and 2160 may be used to power the various elements of the circuit 2300. For example, the circuit 2300 may include various elements such as, but not limited to, microprocessors, RAM chips, ROM chips, and/or RS45 devices. In example embodiments, the circuit 2300 may be used to control a device 2800 attached to the node 2000, for example, an LED light and/or a sensor.

In example embodiments, the node 2000 may have an identification parameter. For example, in example embodiments, the identification parameter may be unique and may be embedded in an electronic table accessible by the circuit 2300 or may be embedded in an electronic table which is part of the circuit 2300. In example embodiments the data received by the node 2000 may have an address portion and a non-address portion. The address portion may include identification data and the non-address portion may include control information. For example, in example embodiments, the control information may provide information for controlling the device 2800 attached to the node 2000. In example embodiments a processor of the circuit 2300 may read the address portion of the data and determine whether the data was intended for itself or another node by comparing the identification data embedded therein to the node's identification parameter. If the processor determines the data is intended for itself the circuit 2300 may further process the data to obtain control information and may also send a reply signal back to the data and power providing device to cause the data and power providing device to execute another action. In the alternative, if the processor of the circuit 2300 determines the data is intended for another node, the circuit 2300 may simply pass the information along to the second port 2200 via a second set of conductive lines 2500 so this information may be passed to a downstream node. For example, in example embodiments the circuit 2300 may pass the data to the first and second ports 2210 and 2220 of the second port 2200.

As mentioned above, the node 2000 may have a relatively low voltage applied at a pair of contacts to power the circuit 2300. In example embodiments, additional power may be required to control the device 2800 attached to the node 2000. In example embodiments the node 2000 may be further configured to have relatively high voltages applied at the other contacts of the first port 2100. For example, in example embodiments, a larger voltage, for example 55V, may be applied to the fourth and fifth contacts 2140 and 2150 and the seventh and eighth contacts 2170 and 2180. This voltage may be used by the circuit 2300 to control the device 2800.

In example embodiments the voltage applied to the fourth, fifth, seventh, and eighth contacts 2140, 2150, 2170, and 2180 does not necessarily have to be applied when data is sent to the first and second contacts 2110 and 2120. For example, in example embodiments the circuit 2300 may be powered by the relatively low voltage applied to the third and sixth contacts 2130 and 2160 and may receive data via the first and second contacts 2110 and 2120. The circuit 2300 may determine whether or not data was intended for itself or another node by comparing its identification parameter to an identification data embedded in the data. If the circuit 2300 determines the data is intended for itself the circuit 2300 may send a request, via the first and second contacts 2110 and 2120, to the data and power providing device to have the data and power providing device apply a relatively large voltage to the fourth, fifth, seventh, and eighth contacts 2140, 2150, 2170, and 2180. The circuit 2300 may then use this voltage to control the powered device 2800.

In example embodiments, node 2000 may be daisy chained to other nodes. As such, in example embodiments, node 2000 may be further configured to pass data and power to downstream nodes. For example, in example embodiments, the circuit 2300 may be configured to pass data from contacts 2110 and 2120 to contacts 2210 and 2220 and power from contacts 2130 and 2160 to contacts 2230 and 2260. In this way, the power and data received at the first port 2100 may be sent to the second port 2200 so that data and power may be provided to a downstream node. Similarly, power received at the fourth, fifth, seventh, and eighth contacts 2140, 2150, 2170, and 2180 may be sent to the fourth, fifth, seventh, and eighth contacts 2240, 2250, 2270, and 2280 of the second port 2200 so that this power may also be provided to the downstream node. Also, in example embodiments, the electronic circuit 2300 may be further configured to transfer data from the second port 2200 to the first port 2100. For example, data from a downstream node may be provided to the first and second contacts 2210 and 2220 and this data may be provided to the first and second contacts 2110 and 2120 of the first port 2100 to be sent to an upstream node or some other device.

Figure 9:
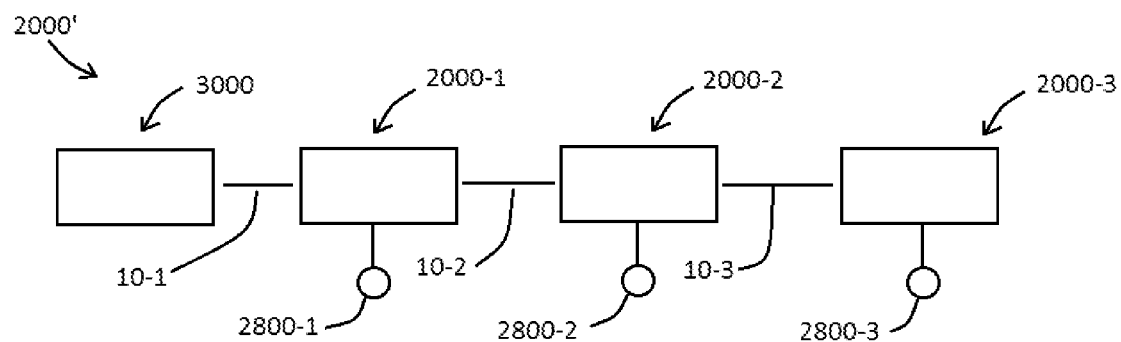
FIG. 9 is a view of a system in accordance with example embodiments.

FIG. 9 is a view of a system 2000' in accordance with example embodiments. In example embodiments, the system 2000' includes a power and data providing device 3000, a first node 2000-1 configured to control a first powered device 2800-1, a second node 2000-2 configured to control a second powered device 2800-2, and a third node 2000-3 configured to control a third powered device 2800-3. In example embodiments a first cable 10-1 may connect the power and data providing device 3000 to the first node 2000-1, a second cable 10-2 may connect the first node 2000-1 to the second node 2000-2, and a third cable 10-3 may connect the second node 2000-2 to the third node 2000-3. In example embodiments the first, second, and third cables 10-1, 10-2, and 10-3 may be, but are not required to be, Ethernet cables. Although the system 2000' of FIG. 9 illustrates three nodes daisy chained together, the system 2000' may include only a single node, two nodes or more than three nodes. In other words, the number of nodes of system 3000' is not meant to be a limiting feature of example embodiments but is meant for purposes of illustration only.

In example embodiments each of the nodes 2000-1, 2000-2, and 2000-3 may be substantially identical to node 2000, thus, detailed descriptions thereof is omitted for the sake of brevity.

In example embodiments, an operator may desire to turn on the powered device 2800-2 associated with the second node 2000-2 of system 2000'. To do so, the operator may use the data and power providing device 3000 to send a signal to the first node 2000-1 via the first cable 10-1. In example embodiments, the signal may be sent over a single pair of wires of the first cable 10-1 to be received at a pair of contacts at a first port of node 2000-1. In example embodiments the data and power providing device 3000 may also apply a relatively low voltage (for example, 5V) to another pair of contacts of the first port of node 2000-1 via another pair of wires of the cable 10-1 to power the circuit of node 2000-1. The signal may include an address which may be read by the electronic circuit of the first node 2000-1. In this case, because the signal is intended for the second node 2000-2 an identification number in the signal would not correspond to the identification number of the first node 2000-1. As such, the circuit of the first node 2000-1 would determine the data was not meant for itself and would simply pass the data and low power voltage to the second node 2000-2 via the second cable 10-2. The electronic circuit of the second node 2000-2 would read the address in the message and determine the message is intended for it. In response, the electronic circuit of the second node 2000-2 would send a signal back to the data and power providing device 3000 via the second cable 10-2, the first node 2000-1, and the first cable 10-1 to cause the data and power providing device 3000 to apply relatively high voltage (for example, 55 V) to two pairs of contacts of the first port of the first node 2000-1 and the electronic circuitry of the first node 2000-1 would cause this voltage to be applied to two pairs of contacts of the second node 2000-2 via the second cable 10-2. The electronic circuitry of the second node 2000-2 may use this voltage to control the powered device 2800-2 associated with the second node 2000-2.

It is noted the particular arrangement of the described node 2000 is not intended to limit example embodiments. For example, rather than having a data and power providing device provide data at contacts 2110 and 2120 of the first port 2100 the data may be provided to another pair of contacts, for example, 2170 and 2180. Similarly, rather than applying a low voltage at contacts 2130 and 2160 low voltage may be applied at another pair of contacts such as contacts 2110 and 2120. Furthermore, rather than providing low voltage at contacts 2130 and 2160 the low voltage may be applied to contacts 2110 and 2120 along with the data. In this later embodiment the data may overlie a voltage applied to the contacts 2110 and 2120 and the voltage applied to contacts 2110 and 2120 may be used to power the circuit 2300. This latter embodiment has the advantage of freeing up a pair of lines for application of a relatively large voltage.

Figure 10:
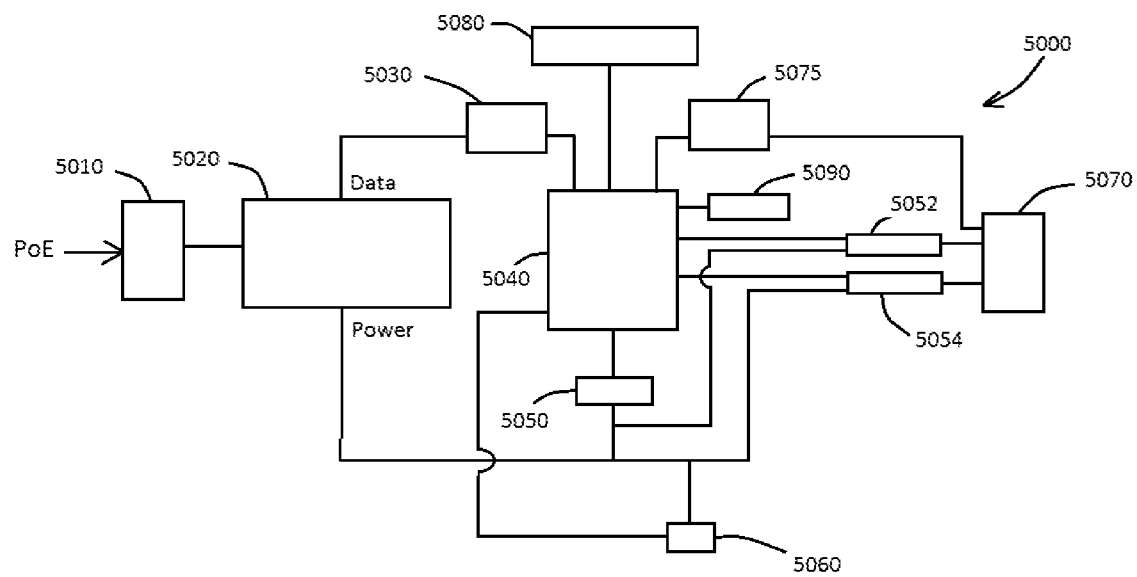
FIG. 10 is a view of a circuit in accordance with example embodiments.

FIG. 10 is a view of a circuit 5000 in accordance with example embodiments. In example embodiments the circuit 5000 may include a port 5010 configured to receive an end of a cable, for example, a conventional Ethernet cable. For example, the port 5010 may be an RJ45 connector or some other port configured to receive the cable. In example embodiments, the port 5010 may receive both power and data from the cable. For example, the port 5010 may interface with a cable providing conventional PoE, PoE Plus, or UPoE. In other words, the port 5010 may receive both power and data from a power and data providing device. In this example, the power and data providing device may be a network switch.

In example embodiments data and power provided to the port 5010 may be sent to a power and isolation circuit 5020 where power and data are separated. The data may be sent to an analog to digital converter 5030 (for example, an Ethy Phy) before being sent to a microprocessor 5040. The power may be routed within the circuit 5000. For example, a portion of the power may be provided to the microprocessor 5040 as a voltage source 5050 and another portion of the power may be sent to a first switch 5052 (which may be, but is not required to be, a MOSFET). For example, 3.3 V may be made available to the microprocessor 5040 and 5 V may be made available to the first switch 5052. Another portion of the power may be routed to a powered device 5060, for example, an LED driver, which may be controlled by the microprocessor 5040. Another portion of the power may be provided to a second switch 5054 which may be, but is not required to be, a MOSFET. The power provided to the second switch 5054 may be relatively high compared to the power provided to the first switch 5052. For example, power provided to the second switch 5054 may be about 55 Volts.

In example embodiments, the microprocessor 5040 may process the data from the analog to digital converter 5030 and perform various functions based on the data. For example, if the data includes information for controlling the powered device 5060 the microprocessor 5040 may control the powered device accordingly. The microprocessor 5040 may, of course, perform other tasks. For example, the microprocessor 5040 may determine that power should be sent to a second port 5070 of the circuit through the first switch 5052. Thus, in example embodiments the microprocessor may send an "on" signal to the first switch 5052 to allow power to flow through the first switch 5052 and to the second port 5070. This power may be about 5 Volts and may be applied to a pair of contacts associated with the second port 5070. The microprocessor 5040 may also control the second switch 5054. For example, the microprocessor 5040 may send an "on" signal to the second switch 5054 to allow power to flow to another pair of contacts of the second port 5070. This may be the relatively high voltage power as was previously described. For example, by turning the second switch 5054 "on" 55 Volts may be applied to another pair of contacts of the second port 5070.

In example embodiments data may flow to and from the second port 5070. In example embodiments an RS 485 5075 may be employed to facilitate data communication between the microprocessor 5040 and the second port 5070 (which may also be, but is not required to be, configured as a RJ 45 connector).

In example embodiments, the circuit 5000 may include additional components such as and in-circuit serial programming header 5080 and an EEPROM 5090. The EEPROM 5090 may store information such as, but not limited to, identification data and data for implementing an algorithm. The in-circuit serial programming header 5080 may be provided for programming the microprocessor 5040 and debugging the microprocessor 5040. However, because these components are readily understood by one skilled in the art, a detailed description thereof is omitted for the sake of brevity.

In short, FIG. 10 illustrates an example of a circuit where PoE (PoE Plus or UPoE) may be received at a first port 5010 and the circuit may send data and power to a second port 5070, where the data may be provided to a first pair of contacts at the second port 5070, relatively low voltage may be applied to another pair of contacts of the second port 5070, and a relatively high voltage may be applied to another pair of contacts of the second port 5070.

Figure 11:
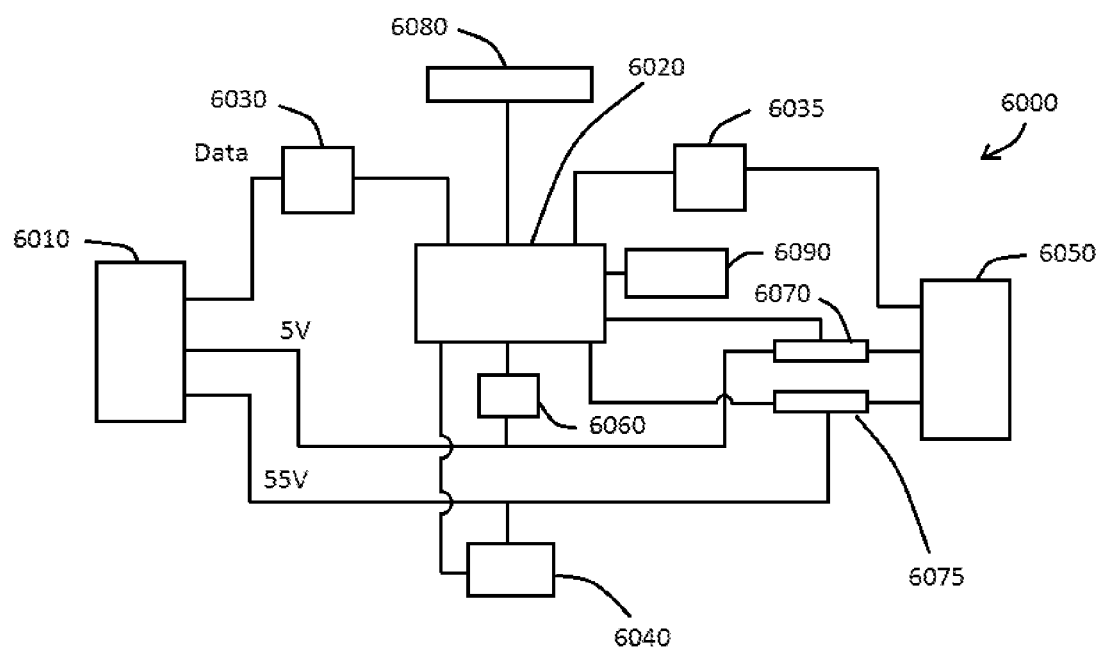
FIG. 11 is a view of another circuit in accordance with example embodiments.

FIG. 11 is a view of a circuit 6000 in accordance with example embodiments. As shown in FIG. 11, the circuit may include a port 6010 configured to receive an end of a cable, for example, an Ethernet cable. In example embodiments the port 6010 may be, but is not required to be, an RJ45 connector. In example embodiments, the port 6010 may include a first pair of contacts to receive data and this data may flow to a microprocessor 6020 via an RS485 6030. The data may, in turn, be processed by the microprocessor 6020 and the microprocessor 6020 may perform various functions based on the data. For example, in example embodiments the circuit 6000 may be connected to a device 6040, for example, an LED light and the microprocessor 6020 may use the data to control the device 6040. On the other hand, the microprocessor 6020 may process this data and send it to a second port 6050 via a second RS485 6035.

In example embodiments, the circuit 6000 may have a relatively low voltage, for example 5V, applied to a pair of contacts of the first port 6010. In example embodiments the circuit 6000 may use this voltage to power the microprocessor 6020 and may provide the microprocessor 6020 about 3.3 V of power at 6060. The remainder of the power provided at the pair of contacts having the relatively low voltage may be provided to a first switch 6070 which may be, but is not required to be, a MOSFET.

In example embodiments the circuit 6000 may have a relatively large voltage, for example, 55V, applied at another pair of contacts of the first port 6010. This voltage may provide power to the device 6040 and the remainder of the power may be sent to a second switch 6075 which may be, but is not required to be, a MOSFET. In example embodiments the first and second switches 6070 and 6075 may be controlled by the microprocessor 6020. As such, if the microprocessor 6020 determines the relatively small voltage should be applied to a pair of contacts of the second port 6050 the microprocessor 6020 may send an "on" signal to the first switch 6070. Similarly, if the microprocessor 6020 determines a relatively large voltage (for example, 55 V) should be applied to another pair of contacts of the second port 6050, the microprocessor 6020 may send an "on" signal to the second switch 6075 to allow the relatively large voltage be applied to the another pair of contacts of the second port 6050.

In example embodiments, the circuit 6000 may include additional components such as and in-circuit serial programming header 6080 and an EEPROM 6090. The EEPROM 6090 may store information such as, but not limited to, identification data and data for implementing an algorithm. The in-circuit serial programming header 6080 may be provided for programming the microprocessor 6020 and debugging the microprocessor 6060. However, because these components are readily understood by one skilled in the art, a detailed description thereof is omitted for the sake of brevity.

Figure 12:
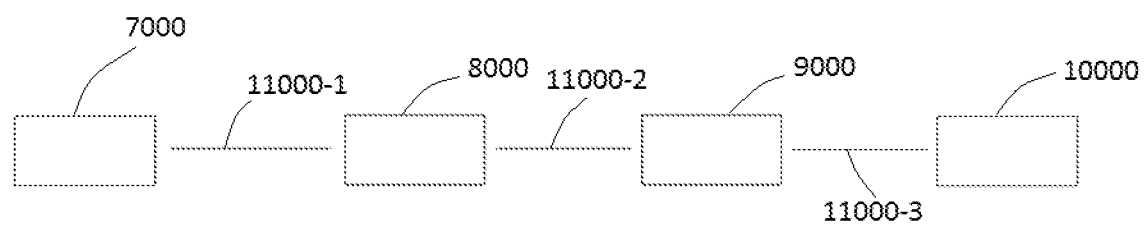
FIG. 12 is a view of a system in accordance with example embodiments.

FIG. 12 is a view of a system that includes a power and data providing device 7000, a first node 8000, a second node 9000, and a third node 10000. In example embodiments the power and data providing device 7000 may be a network switch, the first node 8000 may include the circuitry of FIG. 10, and the second and third nodes 9000 and 10000 may include the circuitry of FIG. 11. In example embodiments the system may include a first cable 11000-1, a second cable 11000-2, and a third cable 11000-3 connecting the power and data providing device 7000 to the first node 8000, the first node 8000 to the second node 9000, and the second node 9000 to the third node 10000. In example embodiments, the first, second, and third cables 11000-1, 11000-2, and 11000-3 may be conventional Ethernet cables as has been previously described. The following illustrates an example of the system wherein a user desires a device powered by the second node 9000 be operated.

In example embodiments, the power and data providing device 7000 may send both data and power to node 8000. In this particular example, the data may include an identification parameter associated with node 9000. In example embodiments the power may be provided as conventional PoE, PoE Plus, or Universal PoE. Initially, the power and data are provided to the first port 5010 of the node 8000. In the node 8000 the circuit 5000 separates the data and power, provides a relatively low voltage to the microprocessor (about 3.3 V), a relatively low power to the first switch 5052, and a relatively high power to the second switch 5054. The microprocessor 5040 checks the message and determines it was intended for another node. A such, the microprocessor 5040 and would respond by sending an "on" signal to the first switch 5052 to send the relatively low power (about 5V) to the second port 5070 and would send the data to the second port 5070 as well. At this time, data is applied to a first pair of contacts at the second port 5070 and a low voltage, for example, about 5V, is applied to a second pair of contacts of the second port 5070.

In example embodiments, the power and data applied to the first and second pairs of contacts of the second port 5070 would flow to the second node 9000 via the second cable 11000-2 and arrive at the first port 6010 of the circuit 6000 of the second node 9000. That is, the data would arrive at a first pair of contacts of the first port 6010 and the power would arrive at a second pair of contacts of the first port 6010. The data would flow to the processor 6020 which would be powered by the relatively low power provided at the first port 6010. The processor 6020 would determine the signal was intended for itself and would respond by sending a signal back to the first node 8000 through the same wires of the second cable 11000-2 which originally transferred the data to it. The data would flow through the circuit 5000 to the microprocessor 5040. The microprocessor would respond by sending an "on" signal to the second switch 5054 causing a relatively large voltage (example, 55V) to be applied to a third pair of contacts of the second port 5070. This would cause power to flow through the second cable 11000-2 to the second node 9000. At the second node 9000 power would be received at a third pair of contacts of the first port 6010 and this power would be used to power the device 5060 attached thereto.

Figure 13:
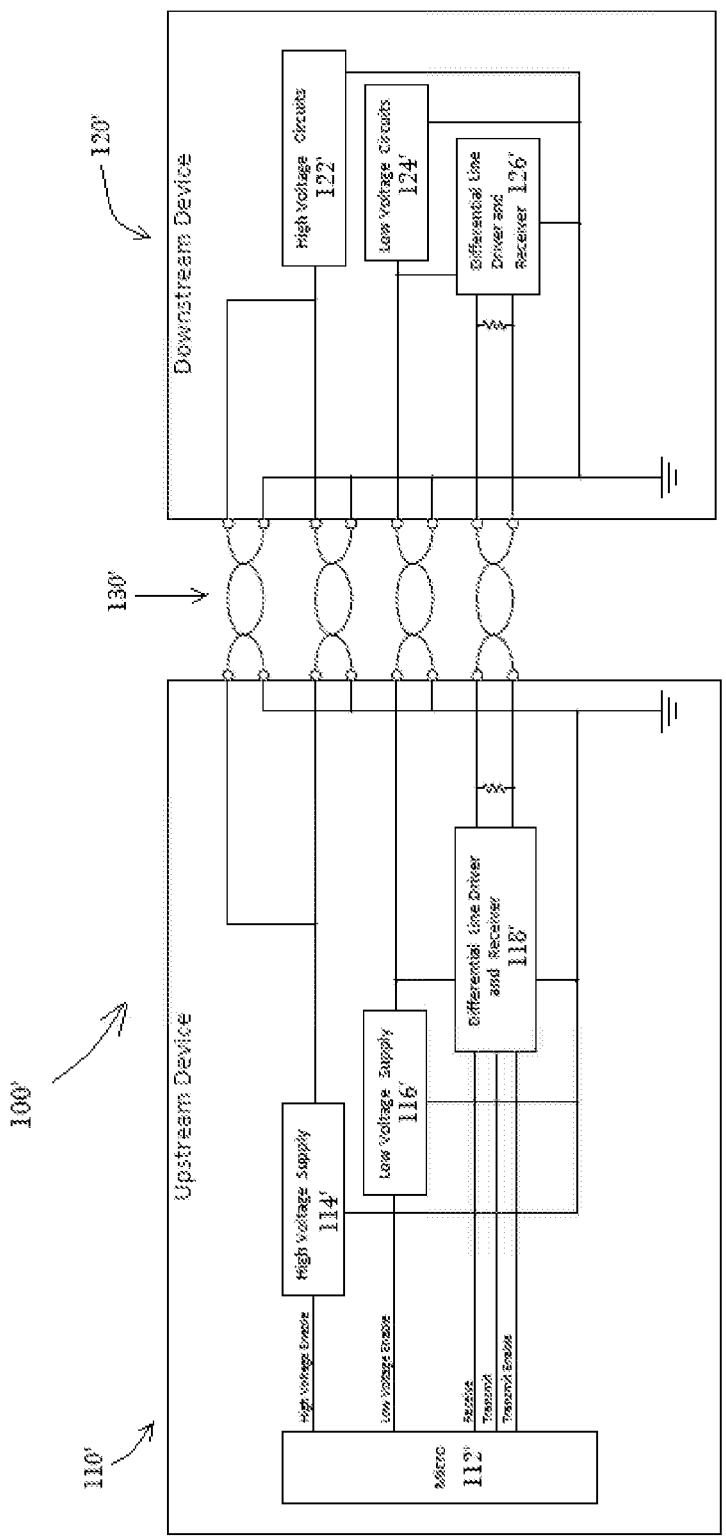
FIG. 13 is a view of a system in accordance with example embodiments.

FIG. 13 is a view of a system 100' in accordance with example embodiments. As shown in FIG. 13, the system 100' may include an upstream device 110' and a downstream device 120'. In example embodiments the upstream device 110' and the downstream device 120' may be connected to one another by a cable 130', for example, an Ethernet cable.

In example embodiments the upstream device 110' may be comprised of various elements. For example, in one embodiment, the upstream device 110' is comprised of a microprocessor 112', a high voltage supply 114', a low voltage supply 116', and a differential line driver and receiver 118' which may be an RS485 line driver and receiver, an RS232 line driver and receiver, or any other type of suitable differential line driver and receiver. The downstream device 120' may be comprised of high voltage circuits 122', low voltage circuits 124', and a differential line driver and receiver 126' which may be an RS485 line driver and receiver, an RS232 line driver and receiver, or any other type of suitable differential line driver and receiver.

In example embodiments, the system 100' may be configured so that at a given time period low and high power to the downstream device 120' is disabled. Low voltage power (for example, 5V) thereafter may be enabled by the upstream device which may provide power to the downstream differential line driver and receiver 126'. In the event the cable 130' is an Ethernet cable, the power may be provided through one pair of twisted wires in the cable 130'. The downstream device 120' may send a message to the upstream device 110' announcing its presence. In the event the cable 130' is an Ethernet cable, the message may be sent through pair of twisted wires which are not same twisted wires through which the low voltage power was provided. The upstream device 110' may receive the message from the downstream device 120'. The microprocessor 112' may process the message and may then enable the high voltage supply 114' to deliver high voltage power (for example, 55V) to the high voltage circuits 122' of the downstream device 120'. In this particular embodiment, if the cable 130' is an Ethernet cable, the high voltage power may be provided over two pairs of twisted wires of the 30' which are not used to deliver the low voltage power or deliver the message from the downstream device 120' to the upstream device 110'.

Figure 14A:
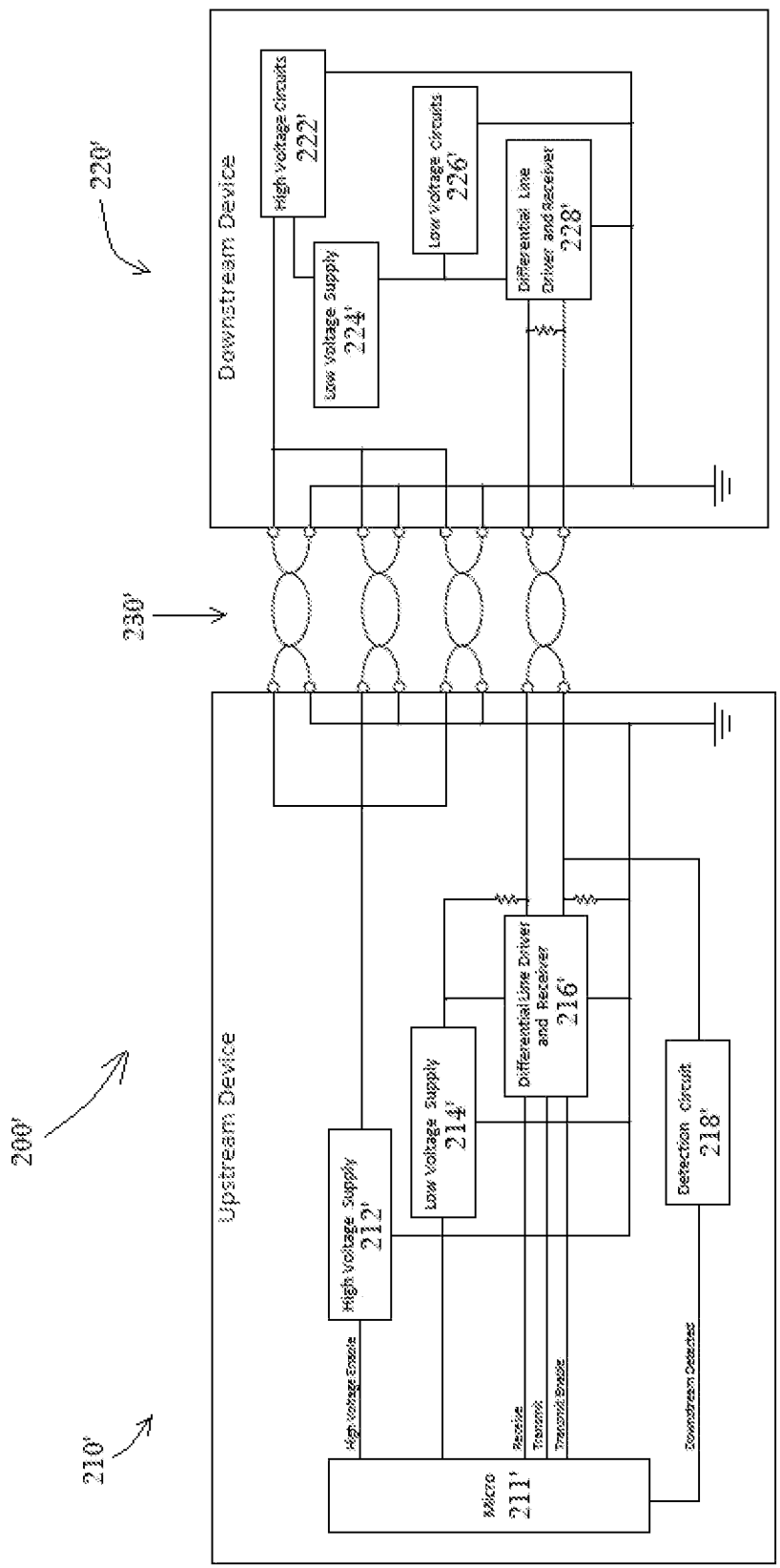
FIGS. 14A and 14B are views of a system in accordance with example embodiments.

FIG. 14A is another example of a system 200' in accordance with example embodiments. As shown in FIG. 14A, the system 200' may include an upstream device 210' and a downstream device 220'. In example embodiments, the upstream device 210 may be comprised of a microprocessor 211', a high voltage supply 212', a low voltage supply 214', a differential line driver and receiver 216', and a detection circuit 218'. In example embodiments the differential line driver and receiver 216' may be an RS485 line driver and receiver, an RS232 line driver and receiver, or any other type of suitable differential line driver and receiver. The downstream detection device 220' may be comprised of high voltage circuits 222', a low voltage supply 224', low voltage circuits 226', and a differential line driver and receiver 228'. In example embodiments the differential line driver and receiver 228' may be an RS485 line driver and receiver, an RS232 line driver and receiver, or any other type of suitable differential line driver and receiver. In example embodiments the upstream device 210' and the downstream device 220' may be connected to one another by a cable 230', for example, an Ethernet cable.

In example embodiments, the system 200' may be configured so that at a point in time no power is provided to the downstream device 220' from the upstream device 210'. In example embodiments the detection circuit 218' may function as a common mode bias and detection circuit. The detection circuit 218' may produce a different common mode voltage level at the upstream device 220' depending on whether a downstream device is present or not. The detection circuit 218' may evaluate a common mode voltage level, if the level is on one side of a threshold a downstream device is present (otherwise it is not). When a downstream device is detected as being present the upstream device microprocessor 211' may enable power to the downstream device 220' to deliver high power (for example, 55 V) to the downstream device 220'. For example, in the event the cable 230' is an Ethernet cable, high power may be delivered to the downstream device 220' via three pairs of wires of the cable 230'. The remaining pair may not be used to transfer power. In the event the downstream device 220' is no longer detected, the microprocessor 211' may disable power to the downstream device 220'. In example embodiments a resister divider may be added as an identification method.

Figure 14B:
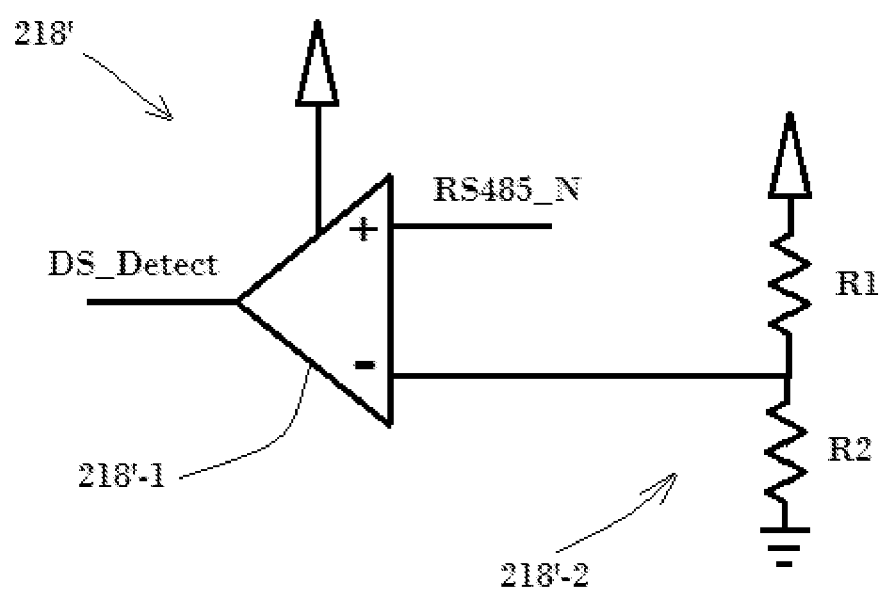

FIG. 14B is a view of a circuit which may serve as the detection circuit 218'. The circuit of FIG. 14B is not meant to limit the invention but to merely provide an example of how the detection circuit 218' may be enabled. As shown in FIG. 14B, the detection circuit 218' may be comprised of an amplifier 218'-1 and a voltage divider 218'-2. The voltage divider 218'-2 may be comprised of a pair of resisters R1 and R2. In this nonlimiting example embodiment, DS_Detect may be pulled high when RS485_N exceeds a threshold set by R1 and R2, otherwise DS_Detect remains low.

The system 200' is different from system 100' in several respects. For example, the system 200' removes the upstream termination and injecting a small amount of current into one of the signal lines of the differential pair which may cause the voltage on that line to rise to the signal to rise to the supply voltage when no downstream device is connected. When a downstream device is connected the voltage is neutralized by the pulldown on the other signal of the differential pair. The pull up and pull down are sized to not interfere with the transmission of signals during normal operation. This system 200' may allow detection of the downstream device over the differential signal pair while the high voltage supply is disabled.

Figure 15A:
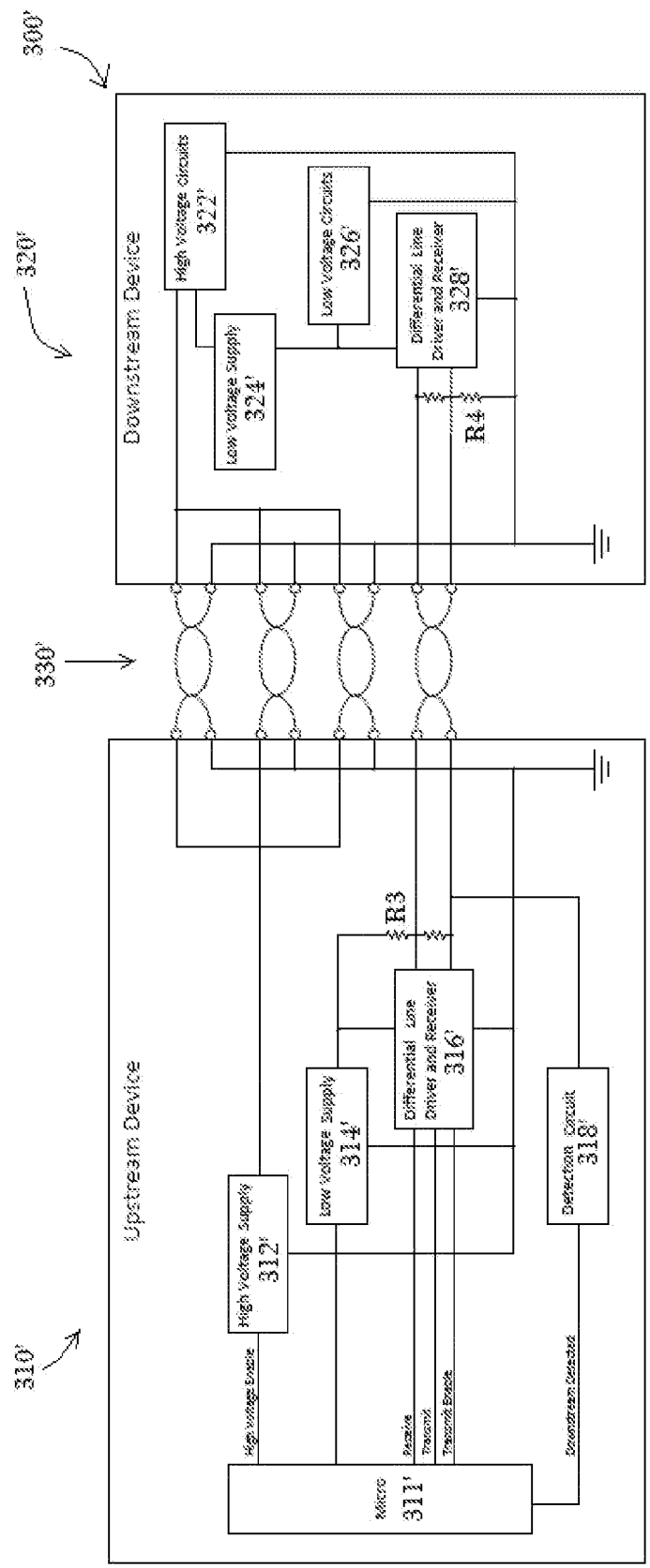
FIGS. 15A and 15B are views of a system in accordance with example embodiments.

FIG. 15A is another example of a system 300' in accordance with example embodiments. As shown in FIG. 15A, the system 300' may include an upstream device 310' and a downstream device 320'. In example embodiments, the upstream device 310 may be comprised of a microprocessor 311', a high voltage supply 312', a low voltage supply 314', a differential line driver and receiver 316', and a detection circuit 318'. In example embodiments the differential line driver and receiver 316' may be an RS485 line driver and receiver, an RS232 line driver and receiver, or any other type of suitable differential line driver and receiver. The downstream detection device 320' may be comprised of high voltage circuits 322', a low voltage supply 324', low voltage circuits 326', and a differential line driver and receiver 328'. In example embodiments the differential line driver and receiver 328' may be an RS485 line driver and receiver, an RS232 line driver and receiver, or any other type of suitable differential line driver and receiver. In example embodiments the upstream device 310' and the downstream device 320' may be connected to one another by a cable 330', for example, an Ethernet cable.

In example embodiments, the system 300' may be configured so that at a point in time no power is provided to the downstream device 320' from the upstream device 310'. In example embodiments the detection circuit 318' may function as a common mode bias and detection circuit. The detection circuit 318' may produce a different common mode voltage level at the upstream device 320' depending on whether a downstream device is present or not. The detection circuit 318' may evaluate a common mode voltage level, if the level is on one side of a threshold a downstream device is present (otherwise it is not). When a downstream device is detected as being present the upstream device microprocessor 311' may enable power to the downstream device 320' to deliver both high and low power to the downstream device 320'. In the event the downstream device 320' is no longer detected the microprocessor 311' may disable power to the downstream device 320'. In this particular nonlimiting example embodiment, high power may be delivered over three pairs of wire of the cable 330'.

Figure 15B:
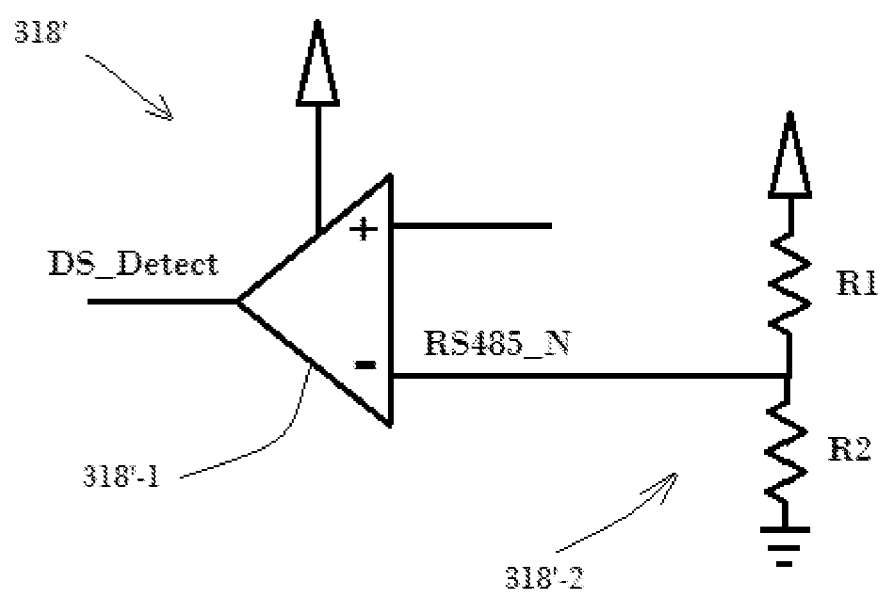

FIG. 15B is a view of a circuit which may serve as the detection circuit 318'. The circuit of FIG. 15B is not meant to limit the invention but to merely provide an example of how the detection circuit 318' may be enabled. As shown in FIG. 15B, the detection circuit 318' may be comprised of an amplifier 318'-1 and a voltage divider 318'-2. The voltage divider 318'-2 may be comprised of a pair of resistors R1 and R2. In this nonlimiting example embodiment, DS_Detect may be pulled low when RS485_N exceeds a threshold set by R1 and R2, otherwise DS_Detect remains high. Also, in the embodiment of FIGS. 15A and 15B, it may be important that resisters R3 and R4 be sized to be just sufficient to overcome a leakage current of the detection circuit 318' and the differential line driver and receiver 316' when the drivers are disabled (high impedance outputs).

In example embodiments the system 300' differs from the system 200' by moving the pull down to the downstream device 320' and restoring the differential termination on the upstream device 310'. This allows detection of the downstream device 320' over the differential signal pair while the high voltage supply is disabled, without degrading a maximum signal frequency and length of the connection.

Figure 16:
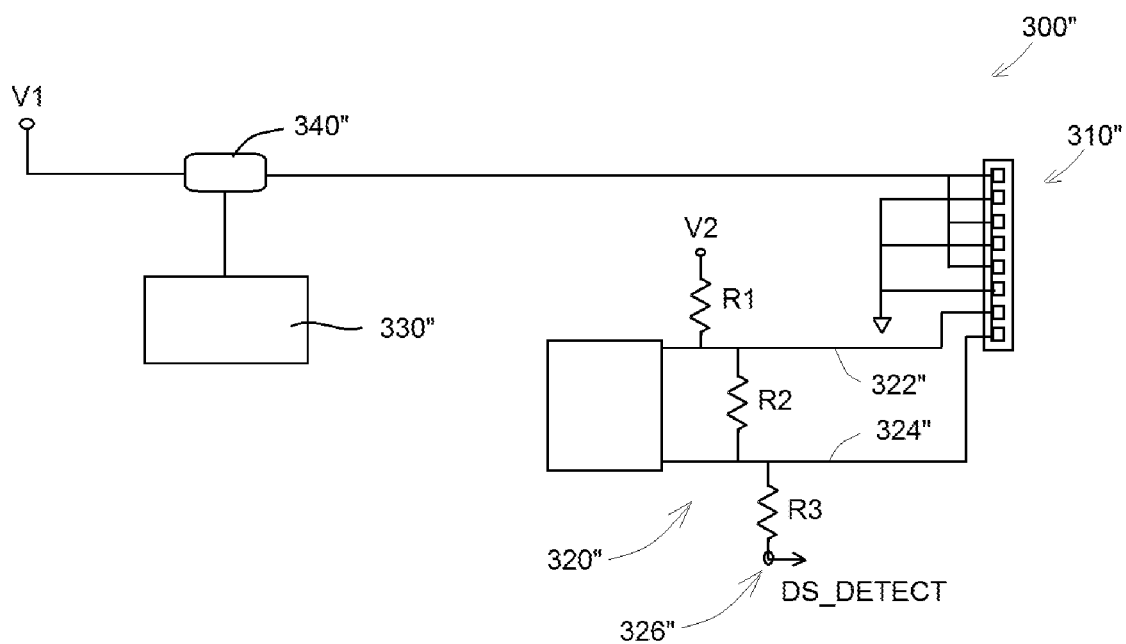
FIG. 16 is a view of a node in accordance with example embodiments.

FIG. 16 is partial schematic view of another node 300" in accordance with example embodiments. The node 300" may be configured to receive power from a power and data providing device such as a network switch. In FIG. 16, the node 300" is illustrated as including a port 310" which may be, but is not required to be, an RJ45 Jack. As such, a cable, such as an Ethernet cable, may attach to the node 300" at port 310". Although not shown in FIG. 16, the node 300" may include another port which may also be an RJ45 Jack. This latter port may be used to connect the node 300" to the power and data providing device to receive power and/or data. In example embodiments, the node 300" may have a relatively large voltage V1, for example, 57 volts, applied thereto by the power and data providing device.

In example embodiments the node 300" may include a detection circuit 320". The detection circuit 320" may include a pair of conductive lines 322" and 324" electrically connected to a pair of contacts in the port 310" and a plurality of resistors R1, R2, and R3. In example embodiments, when the node 300" receives power from the power and data providing device internal circuitry of the node 300" may cause a relatively small voltage V2 to be applied to the detection circuit 320". For example, the node 300" may be configured to apply 3.3 V on the detection circuit 320."

In example embodiments, the ends of the conductive lines 322" and 324" may electrically terminate at a pair of contacts of the port 310" and may form an open circuit, as such, the voltage detected at a detection point 326" may be about the same as the relatively small voltage V2 applied to the detection circuit 320", however, if a device, for example another node, were connected to the port 310", the device may cause current to flow from the first line 322" to the second line 324" reducing voltage at the detection point 326". In example embodiments, the node 300" may include a microprocessor 330" which may periodically monitor the voltage at the detection point 326". The microprocessor 330" may use the voltage monitored at the detection point 326" to control a switch 340" which may be, but is not required to be, a MOSFET. For example, if the voltage at the detection point 326" reduced from its original voltage (for example, around V2) to a smaller voltage, the microprocessor 330" may respond by opening the switch 340" allowing power to flow to three pairs of contacts of the port 310".

In example embodiments, the contacts to which the conductive lines 322" and 324" are electrically connected may be used for data transmission. As such, this pair of contacts may be used for both device detection and data transmission. Also, in example embodiments, since power may be applied to three pairs of contacts of the port 310", a relatively large amount of power may be delivered to a downstream device through the port 310".

Figure 17:
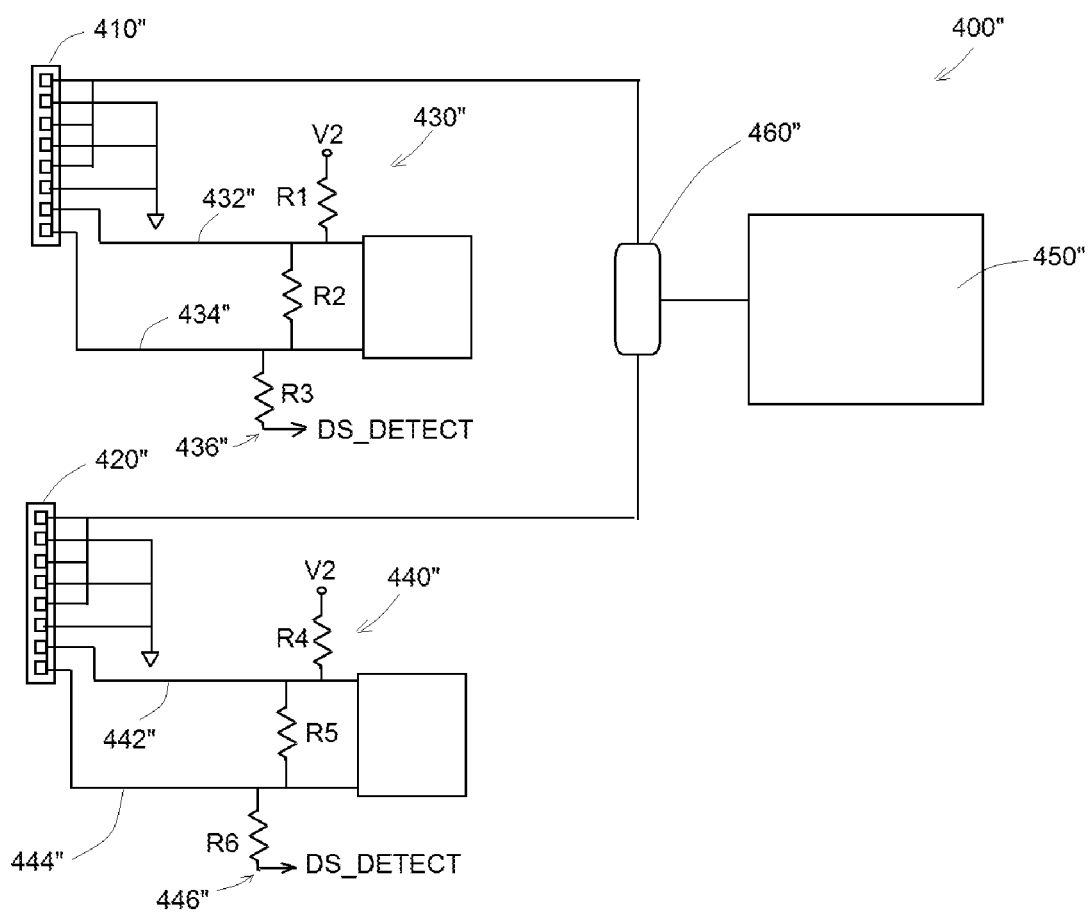
FIG. 17 is a view of a node in accordance with example embodiments.

FIG. 17 is a view of another node 400" in accordance with example embodiments. In FIG. 17, the node 400" is illustrated as including a first port 410" and a second port 420". The first and second ports 410" and 420" may be, but are not required to be, RJ45 jacks. As such, each port 410" and 420" may be configured to receive a cable, for example an Ethernet cable, which may provide power and data to the node 400".

In example embodiments, the node 400" may include a first detection circuit 430" and a second detection circuit 440". The first detection circuit 430" may include a pair of conductive lines 432" and 434" terminating at a pair of contacts in the first port 410" and a plurality of resistors R1, R2, and R3. In example embodiments, when the node 400" receives power at the second port 420" internal circuitry of the node 400" may cause a relatively small voltage V2 to be applied to the first detection circuit 430". For example, the node 400" may be configured to apply 3.3 V on the detection circuit 430" when power is received at the second port 420".

In example embodiments, the ends of the conductive lines 432" and 434" may terminate at a pair of contacts of the first port 410". The conductive lines 432" and 434" may form an open circuit, as such, the voltage detected at the a detection point 436" may be about the same as the relatively small voltage V2 applied to the detection circuit 430", however, if a device, for example another node, was connected to the first port 410" via a cable, for example, an Ethernet cable, and the device allowed current to flow from the first line 432" to the second line 434", the voltage at the detection point 436" may reduce. In example embodiments, the node 400" may include a microprocessor 450" which may periodically monitor the voltage at the detection point 436". The microprocessor 450" may use the voltage to control a switch 460" which may be, but is not required to be, a MOSFET. For example, if the voltage at the detection point 436" reduced from its original voltage (for example, around V2) to a smaller voltage, the microprocessor 450" may respond by opening the switch 460" allowing power to flow from the second port 420" to three pairs of contacts of the first port 410".

In example embodiments, the second detection circuit 440" may include a pair of conductive lines 442" and 444" which may terminate at a pair of contacts in the second port 420" and a plurality of resistors R4, R5, and R6. In example embodiments, when the node 400" receives power at the first port 410" internal circuitry of the node 400" may cause a relatively small voltage V2 to be applied to the second detection circuit 440". For example, the node 400" may be configured to apply 3.3 V on the second detection circuit 440" when power is received at the first port 410".

In example embodiments, ends of the conductive lines 442" and 444" may form an open circuit, as such, the voltage detected at the a detection point 446" may be about the same as the relatively small voltage V2 applied to the detection circuit 440", however, if a device, for example another node, was connected to the second port 420", and the device allowed current to flow from the first line 442" to the second line 444", the voltage at the detection point 446" may reduce. In example embodiments, the microprocessor 450" may periodically monitor the voltage at the detection point 446". The microprocessor 450" may use the monitored voltage to control the switch 460" to allow power to flow from the first port 410" to the second port 420". For example, if the voltage at the detection point 446" reduced from its original voltage (for example, around V2) to a smaller voltage, the microprocessor 450" may respond by opening the switch 460" allowing power to flow from the first port 410" to three pairs of contacts of the second port 420".

In example embodiments, the voltage monitored at the detection points 436" and 446" (and 326") may be used to determine what sort of device is connected to the node 400 (or 300). For example some types of equipment may only decrease the voltage at the detection points 436" and 446" (and 326") to 1 volt whereas other types of nodes may cause the voltage to drop to nearly zero. As such, the monitored voltages may inform the microprocessors 450" and 330" as to what types of equipment are attached thereto and may relay this information to a system administrator implementing the nodes of example embodiments. In example embodiments, resister dividers may be added to enhance the identification method.

Figure 18A:
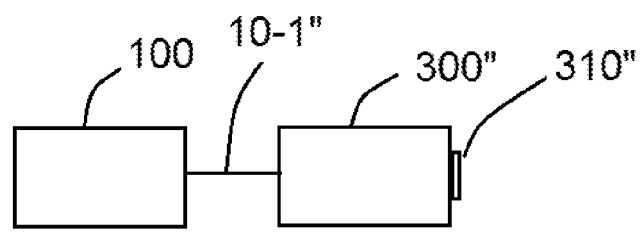
FIGS. 18A-18C are views of a daisy chain in accordance with example embodiments.
Figure 18B:
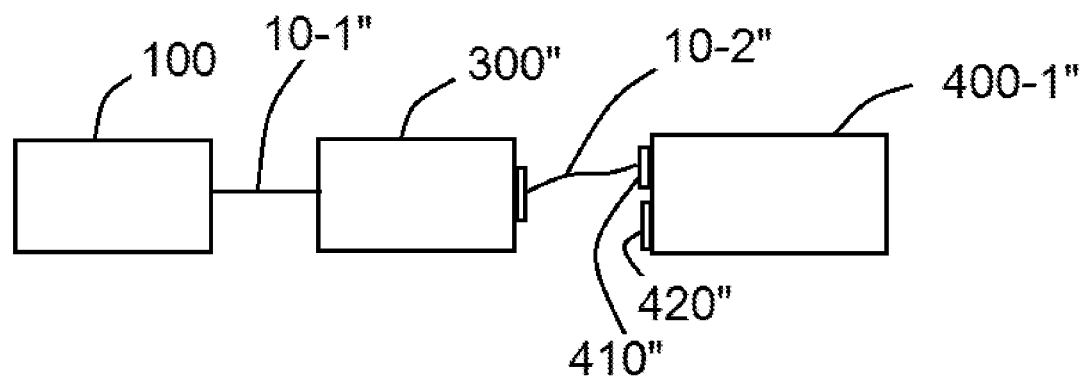
Figure 18C:
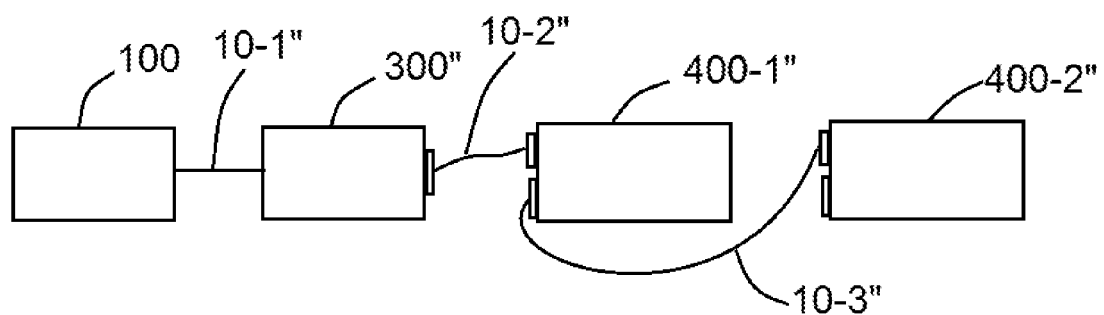

In example embodiments, nodes 300" and 400" may form a daisy chain as shown in FIGS. 18A-18C. As shown in FIG. 18A, the node 300" may be connected to a power and data providing device 100 which may be, but is not required to be, a network switch. In example embodiments power and data may flow from the power and data providing device 100 to the first node 300" via a first cable 10-1" which may be, but is not required to be, an Ethernet cable. In the chain of FIG. 18A, power from the power and data providing device 100 may not flow to the port 310" of the node 300" since, in FIG. 18A, there is no downstream device attached to port 310". However, when a downstream node 400-1" (which may be substantially identical to node 400") is attached to the first node 300" by a second cable 10-2", as shown in FIG. 18B, the detection circuit 326" may detect the presence of the node 400-1" and may automatically provide power to node port 310" which may then flow to 400-1" via the second cable 10-2". The node 400-1", in the daisy chain of FIG. 18B, while receiving power at a first port 410", may not flow this power to the second port 420" since the detection circuit 440" may not detect a downstream node connected to the second port 420". However, in the daisy chain of FIG. 18C, when the third node 400-2" (which may be identical to node 400") is attached to the second node 400-1", the detection circuit 440" of the second node 400-1" may detect the third node 400-2" and may enable power to flow from the first port 410" to the second port 420" and then to the third node 400-2" via a third cable 10-3.

It is understood the nodes 300" and 400" may include additional elements. For example, nodes 300" and 400" may be attached to a powered device, for example, an LED light, and may be configured to provide power to the powered device. As such, the nodes 300" and 400" may include additional circuitry to power the powered devices.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What I claim is:

1. A system comprising:
    an upstream device having a microprocessor, a high voltage supply, a low voltage supply lower than the high voltage supply, a differential line driver and receiver, a detection circuit, and a first port having four pairs of contacts;
    a switch controlled by the microprocessor of the upstream device;
    a downstream device having high voltage circuits configured operate at a high voltage, low voltage circuits configured to operate at a voltage lower than the high voltage, a differential line driver and receiver, and a second port having four pairs of contacts; and
    a cable connecting the first port to the second port thereby connecting the upstream device to the downstream device, wherein the cable includes at least two pairs of wires connecting at least two pairs of contacts of the upstream device to at least two pairs of contacts of the downstream device to provide high voltage to the downstream device, wherein the microprocessor of the upstream device opens the switch when a monitored voltage reduces.

2. The system of claim 1, wherein the cable further includes a pair of wires connecting a pair of contacts of the upstream device to a pair of contacts of the downstream device to provide low voltage to the downstream device.

3. The system of claim 2, wherein the high voltage is about 55 Volts and the low voltage is about 5 Volts.

4. The system of claim 2, wherein the differential line driver and receiver of the upstream device is one of a RS485 line driver and receiver and a R232 line driver and receiver.

5. The system of claim 2, wherein the downstream device is configured to send a message to the upstream device announcing its presence through a pair of wires which are not the at least two pairs of wires of arranged to provide high voltage to the downstream device or the pair of wires arranged to provide low voltage to the downstream device.

6. The system of claim 5, wherein the microprocessor of the upstream device is configured to process the message and enable the high voltage supply to deliver high voltage to the high voltage circuits of the downstream device.

7. The system of claim 1, wherein the at least two pairs of wires connecting at least two pairs of contacts of the upstream device to at least two pairs of contacts of the downstream device to provide high voltage to the downstream device includes three pairs of wires connecting three pairs of contacts of the upstream device to three pairs of contacts of the downstream device to provide high voltage to the downstream device.

8. The system of claim 1, wherein the differential line driver and receiver of the upstream device is one of a RS485 line driver and receiver and a R232 line driver and receiver.

9. The system of claim 1, wherein the switch is MOSFET.

10. The system of claim 1, wherein the monitored voltage is monitored at a detection point of the detection circuit.

11. The system of claim 1, wherein a pair of contacts of the upstream device is used for both data communication and device detection.

* * * * *